US009171429B2

(12) United States Patent
Leslie et al.

(10) Patent No.: US 9,171,429 B2
(45) Date of Patent: Oct. 27, 2015

(54) SLOTS GAME WITH IMPROVING BONUS-WINNING ODDS

(71) Applicant: Zynga Inc., San Francisco, CA (US)

(72) Inventors: Sean Leslie, San Francisco, CA (US); Joseph E Kaminkow, San Francisco, CA (US); Kin Hang Chan, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 14/254,193

(22) Filed: Apr. 16, 2014

(65) Prior Publication Data

US 2015/0045105 A1 Feb. 12, 2015

Related U.S. Application Data

(60) Provisional application No. 61/864,478, filed on Aug. 9, 2013, provisional application No. 61/917,871, filed on Dec. 18, 2013, provisional application No. 61/917,874, filed on Dec. 18, 2013.

(51) Int. Cl.
*A63F 13/00* (2014.01)
*G07F 17/34* (2006.01)

(52) U.S. Cl.
CPC .................................... *G07F 17/34* (2013.01)

(58) Field of Classification Search
CPC ............ G07F 17/3213; G07F 17/3225; G07F 17/3227; G07F 17/323; G07F 17/3267
USPC ................................................ 463/16, 20, 25
See application file for complete search history.

(56) References Cited

U.S. PATENT DOCUMENTS

| | | | | |
|---|---|---|---|---|
| 6,656,050 | B2 | 12/2003 | Busch et al. | |
| 8,465,021 | B2 | 6/2013 | Asher et al. | |
| 8,632,385 | B2 * | 1/2014 | Wald | 463/16 |
| 2009/0088252 | A1 * | 4/2009 | Nicely et al. | 463/42 |
| 2011/0180991 | A1 * | 7/2011 | Hsu | 273/274 |
| 2013/0296017 | A1 | 11/2013 | Baerlocher | |

* cited by examiner

*Primary Examiner* — James S McClellan
(74) *Attorney, Agent, or Firm* — Martine Penilla Group, LLP

(57) ABSTRACT

Methods, systems, and computer programs are presented for adjusting bonus winning odds while playing an online slots game. One method includes an operation for receiving user input during a session of an online slots game, where the user input is defined to spin wheels of the online slots game. In addition, the method includes an operation for defining an initial tier and one or more additional tiers for play of the online slots game during the session, each tier being assigned an odds value that changes with each assigned tier, and each tier being defined to have a set of spins. Further, the method includes operations for assigning tiers with changed odds when an option to play a bonus game is not presented during the predefined set of spins for each tier, and for assigning the initial tier upon determining that the bonus game was played during the session.

22 Claims, 26 Drawing Sheets

Fig. 1D
Fig. 1E
The game may be reset at launch. If so, all coin purchases will be replenished.
HIT IT Rich!
BETA
Buy Coins
Earn Coins
Send Gifts
Help
English
MORE GAMES
HIGH ROLLER PEWTER
4
6,846
BUY COINS
30 LINES
BONUS
30 LINES
PAY TABLE
Bonus!
WIN
TOTAL BET
120
AUTO SPIN
SPIN
MAX BET
1770
INVITE FRIENDS
SEND GIFTS
LEADER BOARDS
COLLECT GIFTS
The game may be reset at launch. If so, all coin purchases will be replenished.
HIT IT Rich!
BETA
Buy Coins
Earn Coins
Send Gifts
Help
English
MORE GAMES
HIGH ROLLER PEWTER
4
6,084
BUY COINS
WILD
30 LINES
BONUS
30 LINES
PAY TABLE
Bonus!
WIN
TOTAL BET
120
AUTO SPIN
SPIN
MAX BET
513
INVITE FRIENDS
SEND GIFTS
LEADER BOARDS
COLLECT GIFTS

Fig. 1F
Fig. 1G
The game may be reset at launch. If so, all coin purchases will be replenished.
Buy Coins
Earn Coins
Send Gifts
Help
English
SEND GIFTS!
Don't see a friend listed? You've already sent them a gift today.
Send your friends a Spin Bonus!
ALL FRIENDS
GAME FRIENDS
LIKES GAMES
SEARCH
Eugene Kim
Jose Nunez
Nishit Patel
Madeline ZFood
Ton Pepe
Puddaraju Zalt
David Lee
SELECT ALL & SEND
The game may be reset at launch. If so, all coin purchases will be replenished.
Buy Coins
Earn Coins
Send Gifts
Help
English
8,064
SHARE BIG WIN!
2,100
SHARE
30 LINES
120
INVITE FRIENDS
SEND GIFTS
LEADER BOARDS
COLLECT GIFTS

Fig. 1H
Fig. 1I
The game may be reset at launch. If so, all coin purchases will be replenished.
Buy Coins
Earn Coins
Send Gifts
Help
English
GIFT CENTER
6,084
COINS
BONUS SPINS
CHALLENGES
RESULTS
You can accept 15 more coin gifts today.
12,374
HIGH ROLLER
REWARDS
Welcome, Asp!
The SC High Roller program rewards your passion for our games with bonuses for chip purchases, exclusive content, enhanced customer service, unique gameplay modes, special offers and more. As your reward points increase from playing more so does your status and benefits.
CURRENT STATUS
50 PTS
1,000 PTS
10,000 PTS
100,000 PTS
8/50
CURRENT STATUS
BENEFITS
EARNING POINTS

Fig. 4C
Fig. 4D
Buy Coins
Earn Coins
Send Gifts
Help
English
BELL
OUT OF ORDER
PLEASE KNOCK
PICK A DOOR KNOCKER
© 2013 Zynga Inc.
Terms of Service | Privacy Policy
The game may be reset at launch. If so, all coin purchases will be replenished.
Buy Coins
Earn Coins
Send Gifts
Help
English
HIGHLIGHT ALL 4 OBJECTS TO OPEN THE CURTAIN
GAME
OVER
PICK A PORTRAIT!
WIN
0

Fig. 4E
The game may be reset at launch. If so, all coin purchases will be replenished.
HIT IT Rich!
BETA
Buy Coins
Earn Coins
Send Gifts
Help
English
CONGRATS
CHALLENGE SCORE
725
BET MULTIPLIER
3x
BONUS WIN
2175
COLLECT

Fig. 5C
The game may be reset at launch. If so, all coin purchases will be replenished.
HIT IT Rich!
Buy Coins
Earn Coins
Send Gifts
Help
English
GLINDA'S FREE SPINS
WILD
30 LINES
30 LINES
SPINS REMAINING
4
Good Luck!
WIN
0

Fig. 6C
Fig. 6D
The game may be reset at launch. If so, all coin purchases will be replenished.
Buy Coins
Earn Coins
Send Gifts
Help
English
SELECT 3 EMERALDS!
JACKPOT
15007
6015
3023
1521
GOAL
30
513
0 / 30
GOAL
© 2013 Zynga Inc Terms of Service | Privacy Policy
The game may be reset at launch. If so, all coin purchases will be replenished.
Buy Coins
Earn Coins
Send Gifts
Help
English
44 TO GO
JACKPOT
15007
65
40
1
6015
3023
GOAL
150
1521
513
106 / 150
GOAL
© 2013 Zynga Inc Terms of Service | Privacy Policy

Fig. 6E
Fig. 6F
The game may be reset at launch. If so, all coin purchases will be replenished.
HIT IT Rich!
Buy Coins
Earn Coins
Send Gifts
Help
English
CONGRATULATIONS!
CHALLENGE FRIENDS?
CHALLENGE SCORE
725
ASP
WIN 100
For every friend you outscore in this bonus game!
CHALLENGE
WIN
725
The game may be reset at launch. If so, all coin purchases will be replenished.
HIT IT Rich!
Buy Coins
Earn Coins
Send Gifts
Help
English
CHALLENGE!
Weekly Challenge bonus winners receive additional coins and XP rewards!
Send your friends a Challenge Bonus!
ALL FRIENDS
GAME FRIENDS
LIKES GAMES
SEARCH
Jose Nunez
Nishit Patel
Madeline ZFood
Ton Pepe
Puddaraju Zait
David Lee
SELECT ALL & SEND
725

SLOTS GAME WITH IMPROVING BONUS-WINNING ODDS

CLAIM OF PRIORITY

This application claims priority from U.S. Provisional Patent Application No. 61/864,478, filed Aug. 9, 2013, entitled "SLOTS GAME WITH IMPROVING BONUS-WINNING ODDS," U.S. Provisional Patent Application No. 61/917,871, filed Dec. 18, 2013, entitled "CHALLENGING PLAYERS IN ONLINE GAME TO COMPETE IN MODULAR GAME", and U.S. Provisional Patent Application No. 61/917,874, filed Dec. 18, 2013, entitled "SLOTS GAME WITH IMPROVING BONUS-WINNING ODDS," all of which are herein incorporated by reference.

CROSS REFERENCE TO RELATED APPLICATIONS

This application is related by subject matter to U.S. patent application Ser. No. 14/253,777, filed Apr. 15, 2014, entitled "Challenging Players in Online Game to Compete in Modular Game", which is incorporated herein by reference.

BACKGROUND

1. Field of the Invention

The present embodiments relate to methods for improving game interactions, and more particularly, methods, systems, and computer programs for challenging other players in a game.

2. Description of the Related Art

The popularity of casino games has extended to casino games played online. Online games such as poker, slots, blackjack, etc., are played by a large number of users on a computer. However, most of the slot games in the market are very similar to the real-life slot games that have been around for a long time, and the online slot games merely seem to copy the user interface provided by the real slot machines, without adding much to the online experience. Because of this, differentiation between game providers is very small.

Additionally, social interaction in online games is appealing to many users that wish to share some of their gaming experience with other friends, or other potential friends that may be made online. But existing slots online games do not currently provide many opportunities for social interaction with other players, nor they provide gaming interactions with other players, as the game of one slots player does not relate to the game of other slots players.

It is in this context that embodiments arise.

SUMMARY

Methods, devices, systems, and computer programs are presented for executing an online game. It should be appreciated that the present embodiments can be implemented in numerous ways, such as a method, an apparatus, a system, a device, or a computer program on a computer readable medium. Several embodiments are described below.

While playing a slots game, users have a chance to win a bonus game, also referred to herein as a minigame or a modular game. The bonus game provides additional variety to the slots game and users look forward to entering bonus games. The bonus games may include other types of slots games with different wheels, or with different wheels, or may also include other types of games, such as selecting objects from a plurality of objects where each object has an associated reward, or games of skill (e.g., memory challenge, trivia game), etc.

In one embodiment, the odds winning the bonus game may be improved if a player does not win the bonus game for a predetermined number of spins. In this case, the player is changed to a different tier where the odds of winning the bonus game are increased. In another embodiment, the expected payback from the bonus may also change as the player changes tiers.

In one embodiment, a method includes an operation for providing an interface to a first player for challenging a second player to compete in the modular game after detecting completion of the modular game by the first player. The modular game is played within an online game. Further, the method includes operations for sending a challenge to the second player, and for detecting that the second player completed the modular game in response to the challenge. The first player is rewarded a challenge award if the first player obtained a higher score than the second player in the modular game. In another embodiment, the operations of the method are executed by a processor.

In another embodiment, a method includes an operation for notifying a second player that a challenge has been received from a first player to compete in a modular game. In addition, the method includes operations for detecting an acceptance by the second player to play the modular game in response to the challenge, and for providing the modular game to the second player in response to the acceptance. The second player is awarded a challenge award if the second player obtained a higher score than the first player in the modular game. Further, the method includes an operation for notifying the first player that the second player completed the challenge.

In yet another embodiment, the method includes an operation for providing a modular game to a first player after the first player wins a bonus to play the modular game, where the first player wins the bonus during play of a slots game. The method further includes an operation for providing, after completion of the modular game by the first player, an interface to the first player for challenging a second player to compete in the modular game. A challenge is sent to the second player to play the modular game within the slots game. Additionally, the method includes operations for detecting that the second player completed the modular game in response to the challenge, and for awarding the first player a challenge award if the first player obtained a higher score than the second player in the modular game.

In one embodiment, a method includes an operation for receiving user input during a session of an online slots game, the user input defined to spin wheels of the online slots game. In addition, the method includes an operation for defining an initial tier and one or more additional tiers for play of the online slots game during the session, each tier being assigned an odds value that changes with each assigned tier, and each tier being defined to have a set of spins. The method further includes operations for assigning tiers with changed odds when an option to play a bonus game is not presented during the set of spins for each tier, and for assigning the initial tier upon determining that the bonus game was played during the session. In one embodiment, the operations of the method are executed by a processor.

In another embodiment, a method includes operations for initializing a spin counter in a slots game, and for setting a first tier from a plurality of tiers as a current tier to play the slots game. Each tier from the plurality of tiers defines a bonus winning odds, an average reward, and a spin count, where the bonus winning odds identifies a probability of winning a chance to play a bonus game. In addition, the method includes an operation for setting a second tier as the current tier when the spin counter reaches the spin count of the first tier. The second tier defines higher bonus winning odds than the first tier and the second tier has a lower average reward than the first tier, to keep an expected payback for winning the bonus game constant across all tiers. Further the method includes operations for setting a third tier as the current tier when the spin counter reaches the spin count of the second tier, and for providing an interface to play the bonus game when a player wins the chance to play the bonus game. After the player plays the bonus game, the spin counter is reinitialized, and the first tier is set as the current tier. In one embodiment, the operations of the method are executed by a processor.

In yet another embodiment, a non-transitory computer-readable storage medium stores a computer program, and the computer-readable storage medium includes program instructions for receiving user input during a session of an online slots game, the user input defined to spin wheels of the online slots game. Further, the storage medium includes program instructions for defining an initial tier and one or more additional tiers for play of the online slots game during the session. Each tier is assigned an odds value that changes with each assigned tier, and each tier is defined to have a set of spins. The storage medium further includes program instructions for assigning tiers with changed odds when an option to play a bonus game is not presented during the set of spins for each tier, and program instructions for assigning the initial tier upon determining that the bonus game was played during the session.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, devices, systems, and computer programs for playing casino games, more specifically, for playing an online slots game.

It will be apparent, that the present embodiments may be practiced without some or all of these specific details. In other instances, well known process operations have not been described in detail in order not to unnecessarily obscure the present embodiments.

Figure 1A:
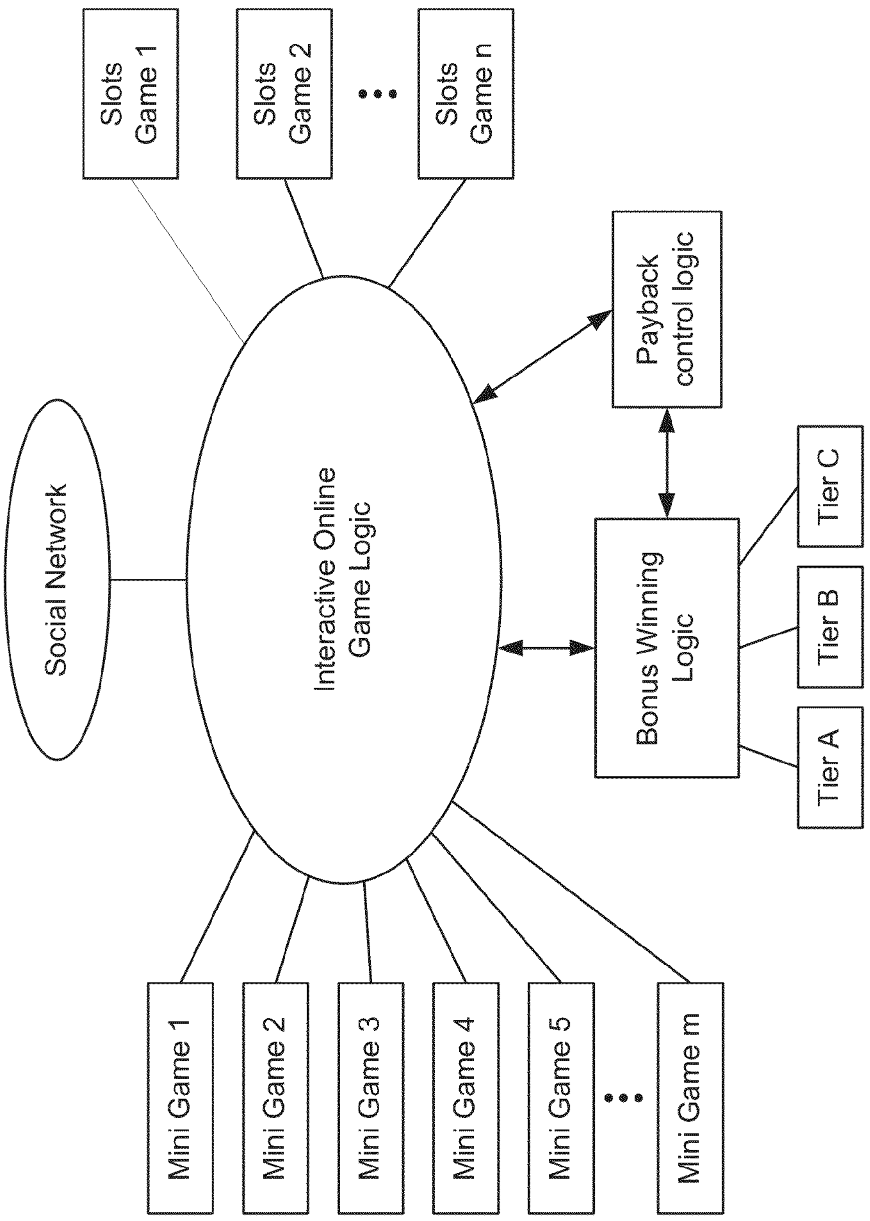
FIGS. 1A-1I illustrate the functionality of the slots game, according to several embodiments.

FIGS. 1A-1I illustrate the functionality of the slots game, according to several embodiments. FIG. 1A illustrates the general architecture of the online game. The interactive online game logic provides the logic for executing the online game, including interfaces, features, communications, rewards, paybacks, game behavior, etc.

In one embodiment, there is a plurality of slots games associated with the interactive game. The interface provides for a lobby-like access page where the user may select from a plurality of different slots games having different themes. For example, the themes may be from a popular TV show, a popular movie, nature, a children story, etc.

In addition, each slots game provides the opportunity to the player to win a bonus game, which is also referred to as a minigame, a module, a modular game, or a supplemental game. When the player wins the bonus, the player enters the modular game, and upon completion of the modular game, the player is rewarded with some asset, which is referred to herein as modular game bonus or minigame bonus. Of course, the reward may be zero if the player loses in the modular game. In other embodiments, the player always gets some reward at the end of the modular game.

In one embodiment, the modular game is played within the online game, and the right to play the modular game is won by achieving a requirement in the online game. For example, in a slots game, the player wins the right to play the modular game when a certain combination of symbols comes up in the slot wheels.

Further, in one embodiment, the initial state of the modular game is independent of a state of progress in the online game, which means that the modular game is initiated always from the same state. This means that when a player challenges another player to play the modular game, the second player will play the same game, although it may vary due to a randomness factor included in a game of chance. However, even when chance is part of the modular game, the odds of winning the modular game are always the same, so when multiple players play the modular game, the odds for winning are the same.

In one embodiment, the modular game is a game that is played with similar conditions (e.g., odds of winning, starting position, difficulty level, etc.) for each of the player that plays the modular game. Therefore, when a player challenges another player, the odds of winning are fair because both players have the same odds. This is different than other competition games where players take turns playing the game. For example, two players playing a chess game will alternate playing, but this is not considered a challenge because every time that a player takes a turn, the position of the board is different, therefore, the odds of winning and the structure of the game at a given turn are different. In a challenge game, the initial state and the odds of winning are the same for both players.

However, chess can also be used as a modular game to challenge another player, if both players are given the same scenario. For example, a challenge game may include a chess problem that includes a chess board and a question, such as "White moves and mates in three moves." The amount of time required to solve the chess problem is measured, and the player that solves the problem in the least amount of time would be the winner of the challenge.

The minigame accessed when winning the bonus is a modular game, which is different from the slots game, played by the user for a limited amount of time or for a limited number of player actions (e.g., spin the wheels five times). Typically, the player exits the slots game, plays the minigame, and then returns back to the slots game. Some minigames require the player to select objects, and each object provides a mystery reward. Other minigames require spinning different set of wheels, etc. In general, users get excited to play the bonus game because the expected payback for playing the minigame is higher than the payback for playing the regular slots game. Some embodiments of minigames are described in more detail below with reference to FIGS. 4A-4E, 5A-5C, and 6A-6N. Further, some users enjoy playing minigames because it gives the users a chance to challenge other players.

In one embodiment, each slots game provides minigames that are exclusive to the slots game, but in other embodiments one or more of the minigames may be accessed from two or more of the slots games.

The interactive online game logic interfaces with one or more social networks to gather relationship information for the players of the online game. In addition, the interactive online game logic may also have its own information regarding relationships, established within the game, for the players. Therefore, the first player may have a second player as a friend, where the second player is a friend in the social network of the first player; and the first player may have a third player as a friend, where the first player and the third player are not related in the social network.

A bonus winning logic component manages the logic behind bonus game rewards. The bonus winning logic component manages the odds of winning the bonus, the paybacks for winning the bonus, as well as which type of minigame is played when the bonus is won.

In one embodiment, the bonus winning logic includes playing the slots game using different tiers at different times, where the different tiers provide different odds of winning the bonus in the slots game. More details are provided below regarding the use of tiers in FIGS. 2A and 2B.

The payback control logic manages the average payback over time to the player when playing the online game. In one embodiment, the payback on the game is measured as the ratio of the cost of one bet to the expected return on one bet.

In one embodiment, the player gets paid when winning on the slots game or when winning in the bonus game or when winning a challenge game. The payback control logic manages the paybacks in both aspects of the game in order to keep the payback at a desired level. For example, in one embodiment, the payback is kept at an average of 95% ratio. This means that, over a long period of time, the player will get back about 95% of the money that the player has bet. In other embodiments, different paybacks are possible, such as paybacks in the range of 80% to 100%, although other values are also possible. For example, in one embodiment, the payback may be over 100% if the players play with virtual money and the game is sponsored by a commercial entity, which allows the player to exchange the virtual winnings for some promotional materials.

Figure 1B:
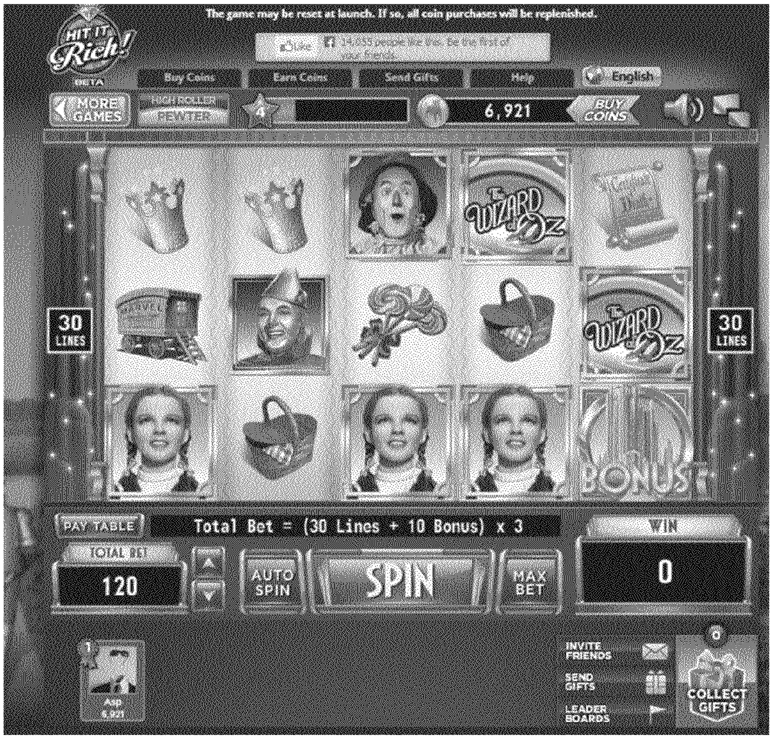
Figure 1C:
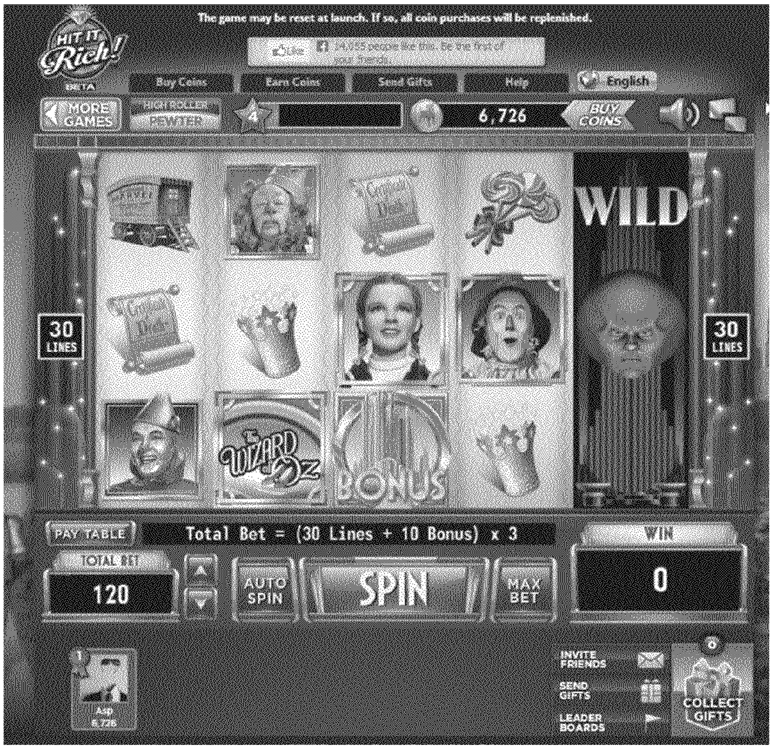
Figure 1D:

FIG. 1B shows a graphical user interface (GUI) for playing an online slots game. It is noted that the embodiments presented herein referred to an online slots game using virtual currency, but the same principles may be applied to real-life money gambling. Of course, the embodiments presented may be applied to real-life money gambling only when their implementation, all or in part, follow the pertinent rules and regulations for real-money gambling. Further, in one embodiment, the slots game includes a random number generator, and for real-money gambling, the random number generator follows the prescribed rules and regulations.

The game illustrated in FIG. 1B includes five different wheels, also referred to as reels, and each reel, at the end of each spin, shows three symbols. In other words, there are three rows of symbols: top, middle, and bottom rows. Sometimes, an icon may occupy more than one row, such as the icon on the right wheel of FIG. 1C. This icon is a large wild icon, which is interpreted as having a wild icon in the top row, a wild icon in the middle row, and a wild icon in the bottom row.

The game provides a chance to win a bonus game when a predetermined combination comes up. In the exemplary embodiment of FIG. 1D, the winning combination consists of the icon "Bonus" appearing in the center row in wheels 1, 3, and 5. As used herein, the wheels are numbered from 1 to 5 going from left to right. In other embodiments, other combinations or other icons may be used to obtain the bonus. In yet other embodiment, there could be a plurality of different bonuses, and different combinations may be utilized to win one bonus from the plurality of different bonuses.

Embodiments presented herein provide methods for managing the frequency and payback of bonus games. Due to the excitement created when a user wins the bonus, having slots game that provide bonus games more often enhances user enjoyment of the game. However, since bonus games usually result in high paybacks, it is necessary to manage the frequency and payback of bonus games in order to keep the overall payback for the slots game at a desired level.

Figure 1E:

FIG. 1E shows a spin resulting in a bonus win because the bonus icons are in the middle row of reels 1, 3, and 5. In addition, the player also has won in the regular slots game, in part due to the wild icon encompassing the three rows of reel number 2.

Figure 1F:

In one embodiment, players can send gifts to friends in the online game, as illustrated in FIG. 1F. The player may define friends in the online game, or friend information may be obtained from a social network with the permission of the player. When the player selects the send-gifts option, the interface allows the player to select one or more friends from all the friends defined in the social network or in the game (tab "All Friends"), or to select friends defined in the game (tab "Game Friends"), etc.

Figure 1G:

FIG. 1G shows an interface provided to the user after a big win. The online game allows the user to share the information with other users, such as on a social network or in some other form, such as a bulletin board for the game, via text or email message, etc.

Figure 1H:

FIG. 1H shows the interface for a gift center, where the player can collect gifts from the game or from friends. In one embodiment, the game provides daily gifts (or for some other period) to the player. Then the player may go to the gift center to collect those gifts. In one embodiment, the gifts may be virtual currency (i.e., coins), or free spins on the slots game, or a challenge, etc. The user interface also provides a tab "Results" for checking the history of activities related to gifting.

Figure 1I:

FIG. 1I illustrates an interface for gaining special status within the online game. In one embodiment, the special status is called "High Roller." The interface provides a status bar indicating progress of the player in the online game. In general, the more the player plays, the more the status bar advances. In addition, the status bar may advance due to other social activities performed by the player in the online game, such as inviting friends to play, liking the game on a social network, accepting challenges from friends, sending challenges to friends, sending gifts to friends, playing regularly the online game, looking at promotional offers from sponsors, etc.

As the player advances in the "High Roller" program, the player is given new status badges showing progress. In addition, the program may provide additional gifts and benefits to the player, rewarding the player for playing the slots game.

It is noted that the embodiments illustrated in FIGS. 1A-1H are exemplary. Other embodiments may utilize different number of wheels, different number of rows visible on the slots game, providing different rewards, utilize a plurality of virtual currencies, utilize real money, etc. The embodiments illustrated in FIGS. 1A-1H should therefore not be interpreted to be exclusive or limiting, but rather exemplary or illustrative.

Figure 2A:
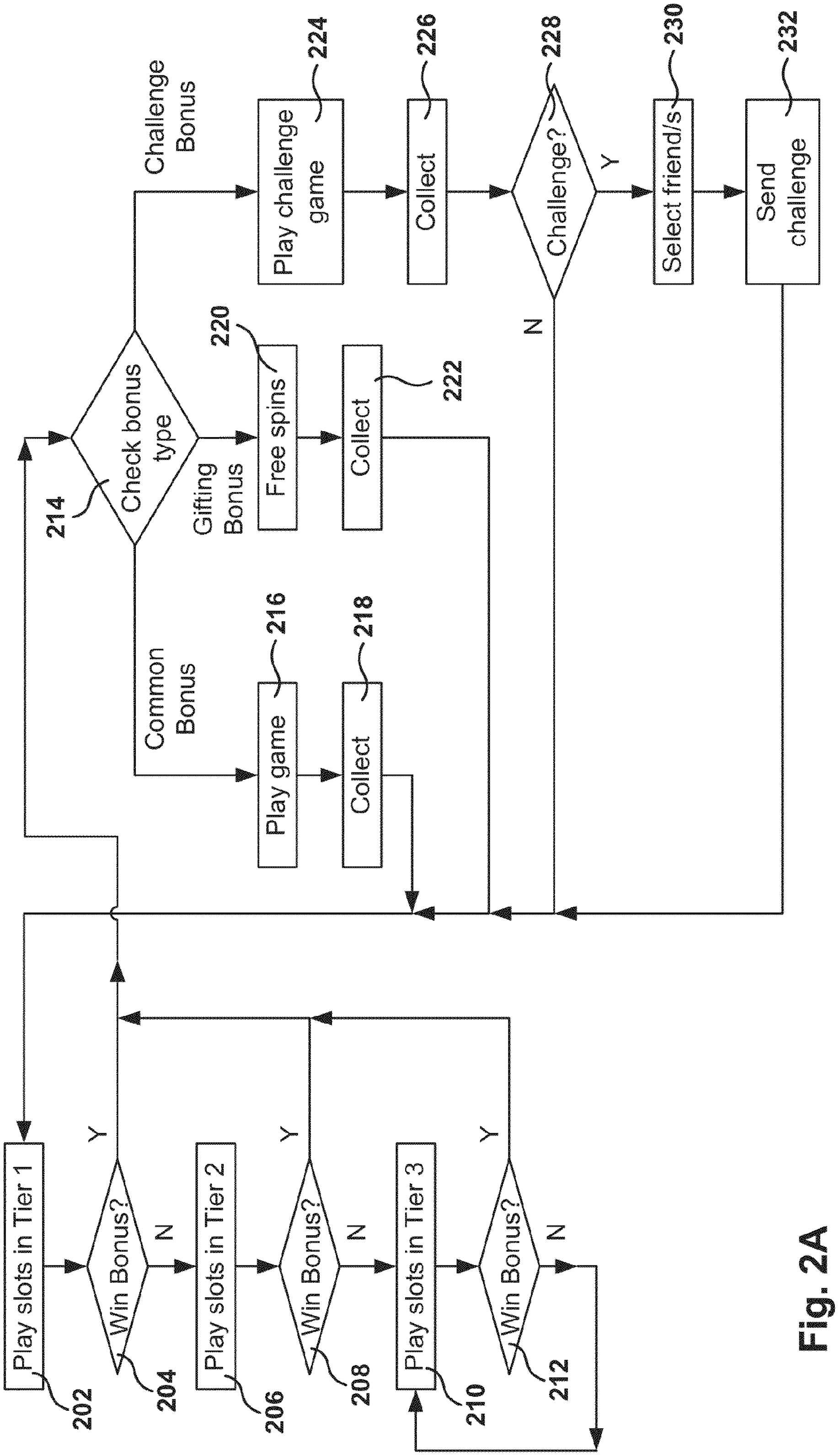
FIG. 2A is a flowchart of a method for playing bonus games, according to one embodiment.

FIG. 2A is a flowchart of a method for playing bonus games, according to one embodiment. While the various operations in this flowchart are presented and described sequentially, one of ordinary skill will appreciate that some or all of the operations may be executed in a different order, be combined or omitted, or be executed in parallel.

In one embodiment, the slots game includes a plurality of tiers, where each tier has different odds for winning the bonus game. In another embodiment, each of the tiers has a different payback ratio, but it's also possible to have the same payback ratio in each of the tiers.

In one embodiment, the tiers are defined based on the number of times the player has spun the wheels in the slots game since the player started the session, or since the player last won the bonus game. More details regarding tier definition are provided below with reference to FIG. 2B.

In operation 202, the player is playing the game in bonus tier 1. In one embodiment, when the player starts playing the slots game, the player starts playing in tier 1, but in other embodiments, the player may start playing the game in other tiers.

From operation 202, the method flows to operation 204 where a check is made to determine if the player has won the bonus while in tier 1. If the player has won the bonus while in tier 1, the method flows to operation 214, but if the player has not won the bonus in tier 1, then the method flows to operation 206. For example, the player may move to tier 2 after spinning 15 times in tier 1 without winning the bonus, but other number of spins are also possible, as well as some other condition to trigger the change to tier 2 (e.g., a special promotion presented by the game provider).

In operation 206, the player plays the slots game with the functionality defined for tier 2. If the player has won the bonus while in tier 2, in operation 208, the method flows to operation 214, and if the player has not won the bonus while in tier 3, the player moves to operation 210 to start playing the slots game in tier 3.

In one embodiment, the slots game has three tiers, but other games may have a different number of tiers. In the embodiment described in FIG. 2A, the slots game has three tiers, therefore, the player keeps playing in tier 3 (operation 210) until the player wins the bonus, unless the player quits the game before winning the bonus.

When the player wins the bonus in tier 3, or in any other tier as described above, the method flows to operation 214 where the game checks for what type of bonus the player has won. In one embodiment, the minigames associated with the bonus may be of different types and have different behaviors. In the embodiment of FIG. 2A, the bonus games are of three types: common bonus, gifting bonus, and challenge bonus.

The common bonus game, in one embodiment, provides a minigame to the player after winning the bonus game. The minigame may be of any kind and be based on chance, or skill (e.g., a memory game). Therefore in operation 216, the player plays the common bonus game, collects a reward at the end of the bonus game in operation 218, and then the method flows back to operation 202, where the player continues playing the game in tier 1. In other words, the spin counter that determines the tiers for the player is reset after winning the bonus.

The gifting bonus provides the player with the opportunity to win virtual currency using free spins on a slots game, which may be the same or different wheels as in the base slots game. Therefore, in operation 220 the player uses the free spins to win currency, and collects her winnings in operation 222. After completion of the gifting bonus, the method flows back to operation 202 to continue playing the main game in tier 1.

The challenge bonus provides a minigame that requires the user to make selections or to use some other skill. In some challenge games, there is a skill component, such as a challenge game based on memory. Therefore, the result of the challenge bonus is variable. In one embodiment, the results depend on which objects the user selects when given a plurality of options. More details on challenge games are given below with reference to FIGS. 3A-3C and 6A-6N.

After playing the challenge game in operation 224, the player collects the rewards from playing the minigame in operation 226, and then the game asks the player if the player desires to challenge a friend (see operation 228). If the player decides to challenge a friend, the method flows to operation 230, and if the player does not desire to challenge a friend the method flows to operation 202.

In operation 230, the player selects one or more friends for the challenge. When a friend accepts the challenge, the friends play the same challenge minigame as the player, although the setup of the game may be different while keeping the winning odds the same. In one embodiment, the player that gets the most points for playing the challenge game gets an additional reward (e.g., 100 chips). Therefore, the player is motivated to challenge friends because if the friends cannot beat the player, the player will get additional chips. In another embodiment, the player that challenges other players will always get a consolation reward every time a friend plays the challenge game.

From operation 230, the method flows to operation 232 where the challenge is sent to the selected one or more friends. After operation 232, the method flows back to operation 202 where the player resumes to play the slots game in tier-1 mode.

In other embodiments, the bonus game may be awarded after a predetermined number of spins. This way, the player is guaranteed to play a bonus game at least every predetermined number of spins.

In another embodiment, the number of spins between bonus games may be predetermined in advance. For example, a list is defined where each member of the list identifies the number of spins of the wheels before playing the bonus game.

If the list starts with the sequence (20, 35, 15, 45, . . . ), after the player starts playing the slots, the bonus game will be awarded after 20 spins, then if the player continues playing another bonus game is awarded after an additional 35 spins, a third bonus game after an additional 15 spins, etc.

In yet another embodiment, the tier may change at each spin. For example, the tier assigned to each spin may be randomized, whereas in each turn, a tier number is assigned with its respective odds for winning the bonus game. This way, the tier may change upwards or downwards during play.

Figure 2B:
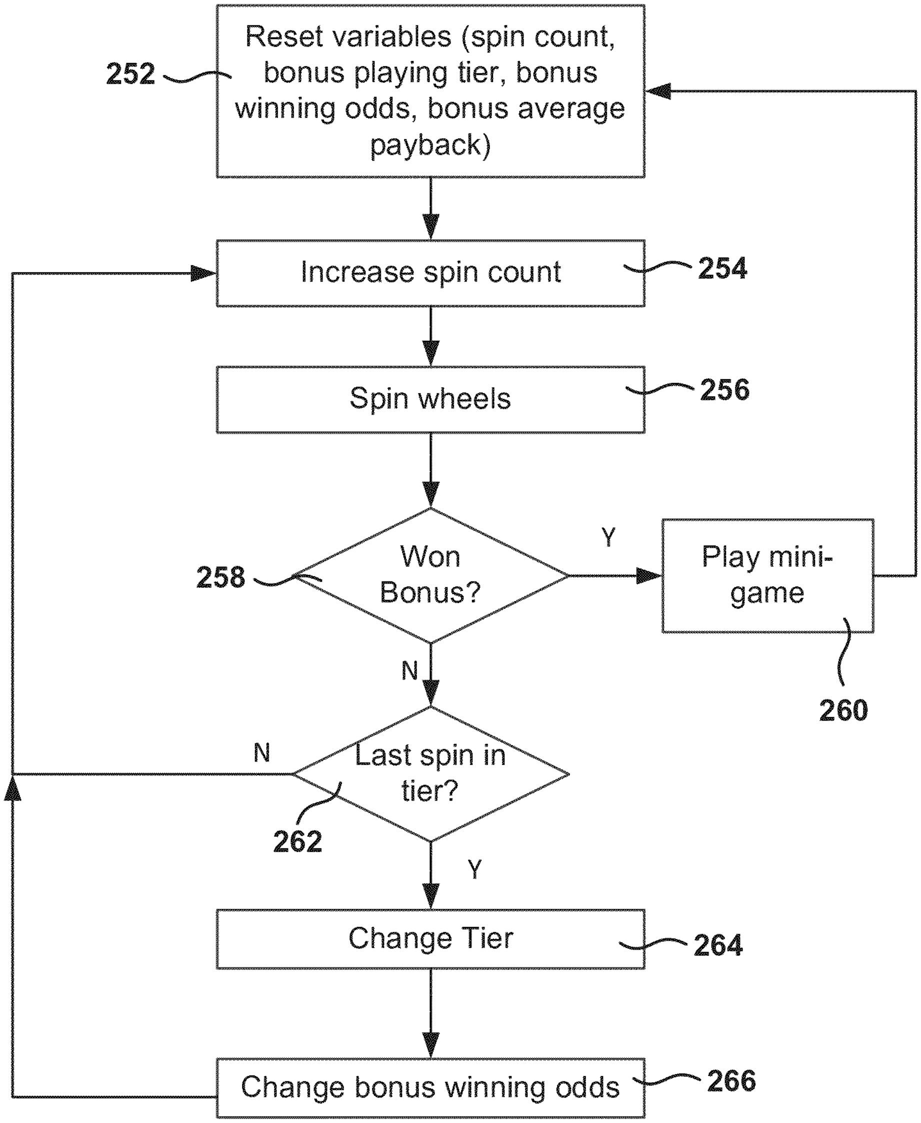
FIG. 2B is a flowchart of a method for dynamically changing bonus-winning odds, according to one embodiment.

FIG. 2B is a flowchart of a method for dynamically changing bonus-winning odds, according to one embodiment. In one embodiment, the probability to win the bonus changes depending on how many times the player has spun the wheel since the player started, or since the player last won the bonus.

In one embodiment, the game keeps a spin counter which counts the number of spins of the wheel since the player started the game or since the player won the bonus game. That is, the spin counter is initialized when the game starts and is reinitialized every time the player wins the bonus game.

If the player completes all the spins within a tier without winning, the player is then taken to the next tier (unless the player has reached the last tier). In the next tier, the odds for winning the bonus are improved, in one embodiment.

Initially, the player has a first probability P1 of winning the bonus (e.g., 1/60). This probability P1 stays constant for a fixed number of spins N1 (e.g., 15), unless the player wins the bonus. If the player has not won the bonus after N1 spins, then the player is changed to a new tier and the odds are improved for the player to a new probability P2 (e.g., 1/50) that is better than P1.

In one embodiment, the slots game has three tiers related to bonus rewards, which are defined by the following table.

TABLE 1

| Tier | Spins | Bonus winning odds |
|---|---|---|
| 1 | 1-15 | 1/60 |
| 2 | 16-30 | 1/50 |
| 3 | 31 or more | 1/40 |

In one embodiment, the online game includes a plurality of variables: the spin count—as described above, the bonus playing tier, the bonus winning odds, and the bonus average payback. The bonus playing tier indicates the tier the player is currently in. The bonus winning odds indicate the probability of winning the bonus, and the bonus average payback indicates the expected value of the payback to the user after playing the minigame.

In one embodiment, the bonus average payback changes according to the tier. For example, the bonus average payback may decrease as the player goes to higher tiers in order to keep the desired payback at the desired level.

In operation 252, the variables identified above are reset. In one embodiment, the spin count is set to 0, the bonus playing tier is set to 1, the bonus winning odds are set to 1/60, and the bonus average payback is set to 30%. However, other values are also possible for initializing these variables. When the player starts playing the slots game, the player starts in operation 252, and after the player wins the bonus, the player goes back to operation 252 after playing the minigame.

From operation 252, the method flows to operation 254 where the spin counter is increased each time the player spins the wheels. From operation 254, the method flows to operation 256 where the game spins the wheels.

After spinning the wheels, the method checks, in operation 258, if the player has won the bonus. If the player has won the bonus, the method flows to operation 260, and if the player has not won the bonus the method flows to operation 262.

In operation 262, the game checks to see if the player has reached the last spin in the tier before the player is promoted to another tier. In other words, the game checks to see if the spin count is equal to the number defined in the upper range of spins within the tier. Of course, in the last tier the upper level is infinity because there are no more tiers to promote the player to.

From operation 262, the method flows to operation 264 if the player has reached the last spin in the tier, and the method flows to operation 252 otherwise. In operation 264, the game changes tiers for the player. In one embodiment, the tier count variable is incremented, the bonus winning odds are changed in operation 266 (e.g., from 1/60 to 1/50 when going from tier 1 to tier 2), and the bonus average payback is also changed. In one embodiment, the bonus average payback stays constant. From operation 266, the method flows back to operation 254 to continue playing the slots game.

In operation 260, the game provides the minigame to the player and gives the player the reward obtained in the minigame. From operation 260, the method flows to operation 252 where the game is reset, including resetting the variables defined above. For example, the spin counter is reset to 0.

In one embodiment, the game provider wishes to maintain a constant payback over time for players of the game. The payback for the game, also referred to herein as global payback, includes two factors: the payback for playing the slots game (slots_payback), and the payback for playing the bonus games (bonus_payback).

$$payback=slots\_payback+bonus\_payback \quad (1)$$

In one embodiment, the game keeps both slots_payback and bonus_payback constant over time, that is, slots_payback is constant and bonus_payback is constant. For example, a payback of 95% might be divided into 65% payback for playing slots and 30% playback for playing bonus games. For example, in a $10,000 bet, 6500 would be paid back on the base game and 3000 would be paid on the bonus game, on average. However, other values for global payback are also possible, and different splits between slots and bonus paybacks are also possible.

The slots payback is controlled by managing the probabilities associated with the different winning combinations in the slots, and their respective payouts. In one embodiment, the slots payback is controlled by adjusting the number of symbols in each of the reels as well as the frequency of occurrence of the different symbols.

In a computer game, the number of symbols in each reel is not limited physically, as in the case of a real physical slots machine. For example, a physical slots machine may have 22 different stops, which may be weighted. However, an electronic slots game may have reels with hundreds of stops. For example, the number of stops in one reel may be 750, or in the range from 100 to 1000, although other values are also possible.

Managing the slots payback may not require adjustments, because the slots payback is kept constant. However, managing the winning combinations for the bonus games may require adjustments if the odds of winning the bonus changes as the player changes tiers.

In one embodiment, the odds for winning the minigame are changed by increasing the number of bonus symbols in the reels. For example, in a reel with 700 symbols, the game may have a first number of bonus symbols in tier 1, a different number of bonus symbols in tier 2, and yet a different number of bonus symbols in tier 3. For example, the game may start with 75 bonus symbols in the reel in tier 1, increase the number to 175 in tier 2, and increase the number to 350 symbols in tier 3.

In one embodiment, to keep the bonus payback constant, the expected bonus payback is adjusted to compensate for the increase in odds for winning the bonus game. The expected payback may be calculated as follows:

$$\text{expected payback} = \text{probability (winning)} \times (\text{average reward}) \quad (2)$$

Therefore, if the probability of winning increases, the size of the average win must decrease to keep the expected payback constant. For example, the following table describes the average reward for the different tiers, described above with reference to Table 1, for a one dollar bet.

TABLE 2

| Tier | Bet | Bonus winning odds | Average reward | Payback |
|---|---|---|---|---|
| 1 | $1 | 1/60 | $18 | $0.30 |
| 2 | $1 | 1/50 | $15 | $0.30 |
| 3 | $1 | 1/40 | $12 | $0.30 |

In other embodiments, the reward distribution may be performed differently across the different tiers. The example of Table 2 provides a constant payback within each tier. However, other embodiments may provide different bonus paybacks in the different tiers, but the overall bonus payback when considering all the tiers, is kept in the desired level (e.g., 30%).

It is noted that the embodiments illustrated in FIGS. 2A and 2B are exemplary. Other embodiments may utilize different number of tiers, different probabilities, different expected paybacks, etc. The embodiments illustrated in FIGS. 2A and 2B should therefore not be interpreted to be exclusive or limiting, but rather exemplary or illustrative.

Figure 3A:
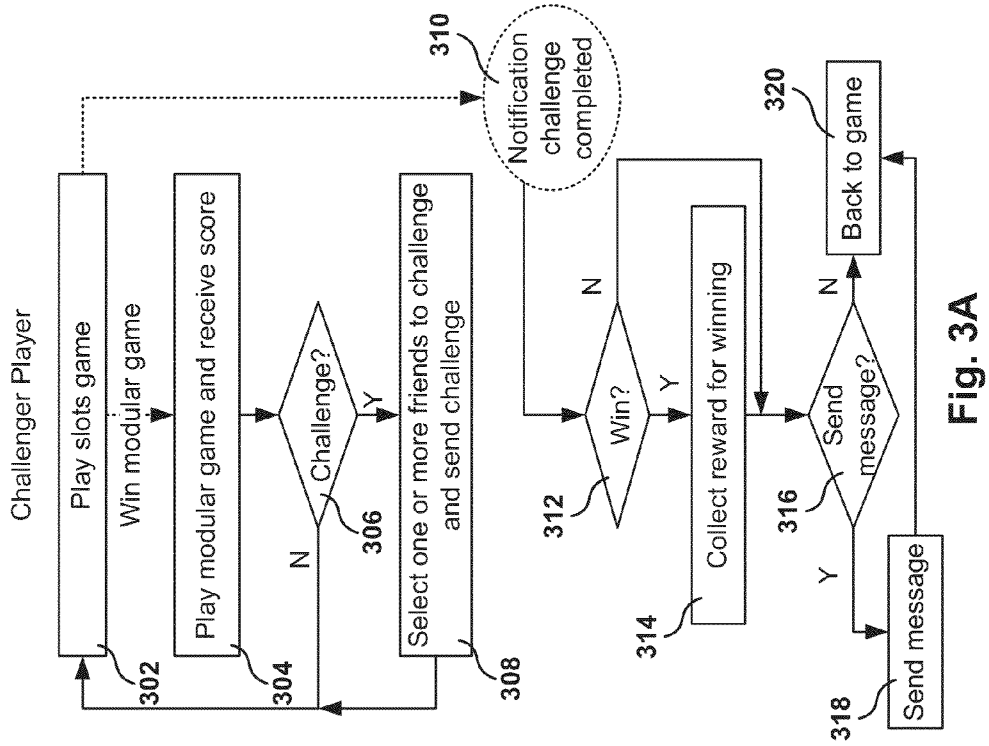
FIG. 3A is a flowchart of a method for challenging players in an online game, according to one embodiment.

FIG. 3A is a flowchart of a method for challenging players in an online game, according to one embodiment. While the various operations in this flowchart are presented and described sequentially, one of ordinary skill will appreciate that some or all of the operations may be executed in a different order, be combined or omitted, or be executed in parallel.

In operation 302, the player is playing an online game (e.g., a slots game). Embodiments presented herein are described with reference to a slots game, but the same principles may be utilized for other online games or other computer games.

When the player wins the chance to play the modular game, the method flows to operation 304, where the player is able to play the modular game. As a result of playing the modular game, the player will receive a score. The score indicates the degree of success obtained by the player in the modular game. For example, the score of the module game may be one of a raw score number obtained in the game, a number of coins collected, a time spent to complete a task, distance traveled, enemies defeated, etc.

In addition, in one embodiment the player is given other options to get the chance to play the modular game and challenge other players. For example, the player may be able to buy challenges using virtual currency or real currency, or the player may win the opportunity to challenge as an incentive for making a purchase in the online game, or for reaching a milestone in the online game, or as part of a loyalty reward for playing a plurality of days in a row, etc.

The modular game may be of different types, and not necessarily of the same kind as the online game. For example, while playing slots the player may win a chance to play a modular game that is a trivia game (e.g., a trivia game about facts of a movie), or a game of chance but with alternative methods to win coins, or a game of speed (e.g., performing a given task as fast as possible), or solving a puzzle, etc. More details regarding the possible modular games are provided below with reference to FIG. 3C.

After completing the modular game, in operation 306 the player is given the options to challenge other players. If the player decides to challenge, the method flows to operation 308, and if the player skips the options to challenge the method flows back to operation 302. In one embodiment, if the player decides not to challenge, a counter indicating the number of challenges available to the player is increased.

In operation 308, an interface is provided to the player to select one or more friends to challenge. In one embodiment, the players that can be challenged include friends of the player in a social network or friends of the player in the online game. In another embodiment, the player is also given the option to challenge other people that are not currently friends of the player.

In another embodiment, the player is provided the option to challenge an unknown player (e.g., an open challenge), that is, challenging anyone (e.g., "does anyone want to accept my challenge?"). In this case, a board with open challenges is providers to players of the online game, and the players of the online game may access the board to accept challenges from other players, or even to add their own open challenges. In one embodiment, the game may charge the player for posting open challenges (e.g., charging currency against the account of the player).

In one embodiment, the player may choose a jeopardy wager as part of the challenge. This means that when the other player accepts the challenge, a bet is made and the winner of the challenge will win the jeopardy wager from the loser. For example, if the jeopardy wager includes a number of units of currency used in the game, the loser will give the winner the amount of units of currency associated with the jeopardy wager. Further, in one embodiment, the game will charge a wager fee to the winner of the challenge. For example, if the wager fee is 5%, the winner will get 95% of the jeopardy wager, and the game (i.e., "the house") will get 5% of the jeopardy wager. Other types of wager fees may also be used, such as within the range from 0.5% to 20%.

After the player selects one or more players for the challenge, the game sends the challenge to the selected one or more players. After the challenges are sent in operation 308, the method flows back to operation 302 where the player continues playing the slots game.

If the player receives a notification that the challenge has been completed by another player (operation 310), the player is given an option to check the status of the challenge. In operation 312 a check is made to determine if the player has won the challenge. If the player has not won the challenge the method flows to operation 316, an if the player has won the challenge the method flows to operation 314.

In operation 314, the player collects the reward for winning the challenge. For example, the player may collect a predetermined amount of game currency. In other embodiment, the player also wins some currency even if the player loses. This causes a viral reinforcement so when friends play challenges, the player still gets a reward for the viral interaction even if the player loses.

In another embodiment (not shown), the player is given an option to re-challenge (e.g., double or nothing), where the amount of the reward is doubled and the challenge is re-sent to the other player. The scenario is more likely in games where a wager is placed, as both players have the incentive, and the risk, to replay the challenge.

From operation 314, the method flows to operation 316 where the player is given an option to send a message to the other player. If the player chooses to send a message, the method flows to operation 318 to send the message, and if the player chooses not to send a message the method flows to operation 320, taking the player back to the game.

Figure 3B:
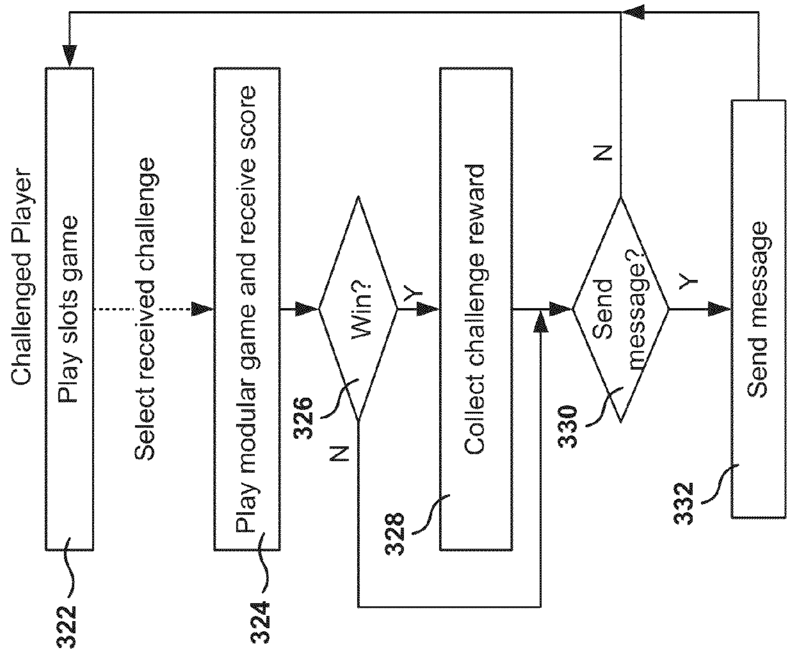
FIG. 3B is a flowchart of a method for receiving challenges, according to one embodiment.

FIG. 3B is a flowchart of a method for receiving challenges, according to one embodiment. While the various operations in this flowchart are presented and described sequentially, one of ordinary skill will appreciate that some or all of the operations may be executed in a different order, be combined or omitted, or be executed in parallel.

In operation 322, the challenged player plays the slots game. When the player receives the challenge and the player accepts the challenge, the method flows to operation 324, where the modular game is played by the challenged player. As a result of playing the modular game, the player receives a score, and in operation 326 a check is made to determine the winner of the challenge.

If the challenged player has won the challenge, the method flows to operation 328 where the player collects the challenge reward. If the player has not won the challenge, the method flows to operation 330. In another embodiment, a consolation reward is also given to the challenged player when the challenged player loses.

From operation 328 the method flows to operation 330, when an option is presented to the player for sending a message to the challenger. If the player decides not to send a message, the method flows to operation 322 to go back to playing the slots game. If the player decides to send a message, the method flows to operation 332 where an interface is provided to enter a message and then send the message to the challenger.

Figure 3C:
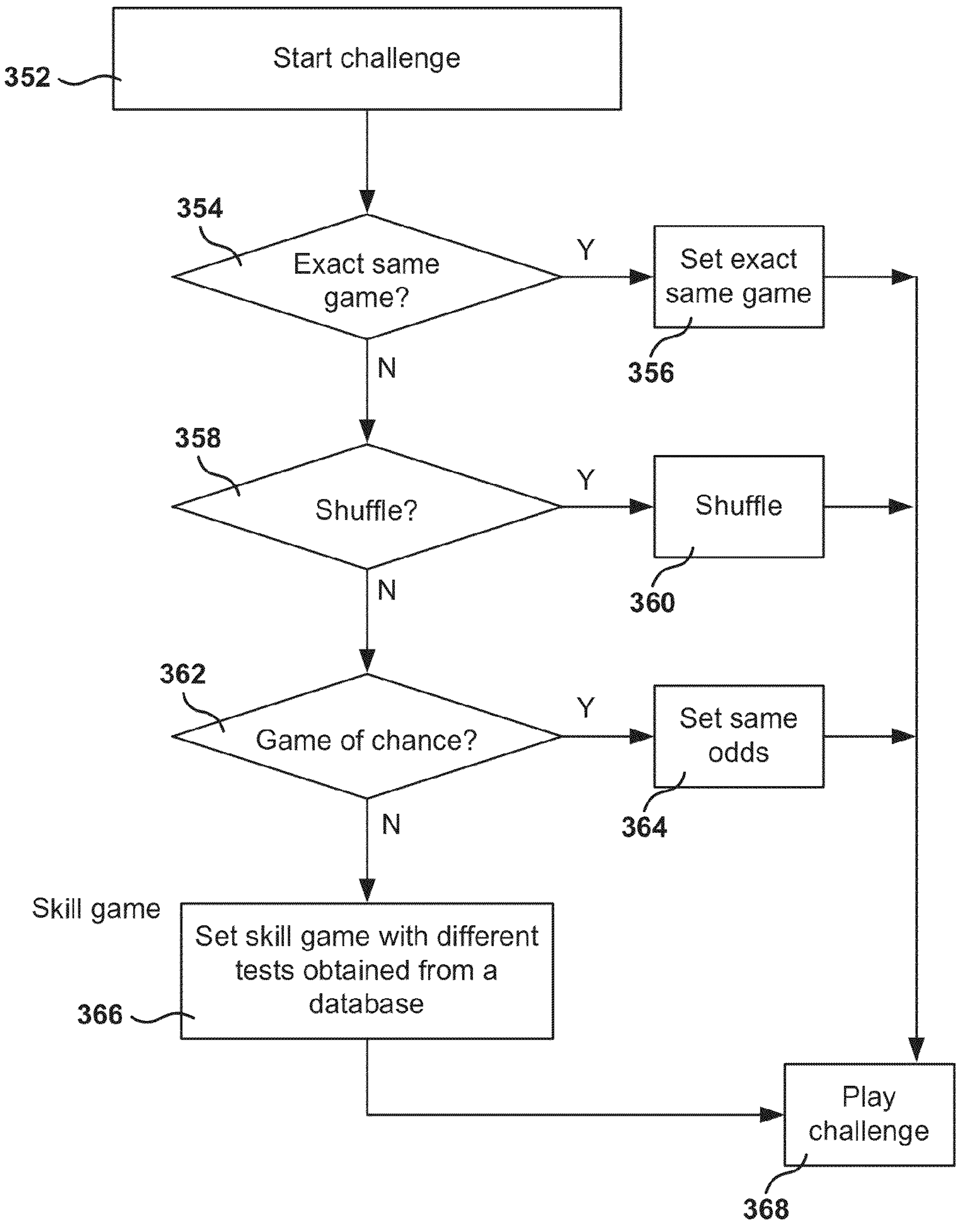
FIG. 3C is a flowchart of a method for setting up the modular game for the challenge, according to one embodiment.

FIG. 3C is a flowchart of a method for setting up the modular game for the challenge, according to one embodiment. While the various operations in this flowchart are presented and described sequentially, one of ordinary skill will appreciate that some or all of the operations may be executed in a different order, be combined or omitted, or be executed in parallel.

In operation 352, the challenged player starts the modular game (i.e., the challenge). In one embodiment, the game sets up the challenge depending on the type of modular game for the challenge. For example, some games will provide an identical scenario to the challenged player, while other games will have different outcomes but with the same probabilities of winning (e.g., both players roll dice and the outcome depends on the points obtained with the dice; although both players may get different rolls of the dice, the odds when rolling the dice are the same for both players).

In operation 354, a check is made to determine if the modular game will have an exact same set up as the setup for the challenger when the challenger played the modular game. In the setup is exactly the same, the method flows to operation 356 and otherwise to operation 358.

In operation 356, the game provides the challenged player the same exact set up as given to the challenger. For example, a modular game may be a memory game with a plurality of cards face down, and the player has to make pairs of cards by picking up two cards at a time. In this embodiment, the layout of the cards is exactly the same for both players. In another example, the modular game is a trivia game, and the challenged player is given the same questions, in the same order, as the questions given to the challenger. From operation 356, the method flows to operation 368.

In operation 358, a check is made to determine if a "shuffle" is needed. As used herein, a shuffle is referred to herein as the change of a distribution of results for a set of options presented to the player. If a shuffle is required, the method flows to operation 360, and if a shuffle is not required the method flows to operation 362 where the shuffle is done.

The result of the shuffle is a modular game with the same options provided to the challenger but in a different order or layout. For example, the modular game may ask the player to select one hidden prize from a list of 9 choices (see for example FIG. 6I with options to peak a basket out of nine possible baskets, where each basket covers a different prize to be given when selected).

In the shuffle operation, the prizes associated with each of the choices are redistributed among the choices, where the prizes are the same but associated with different possible picks for the user. From operation 360, the method flows to operation 368.

In operation 362, a check is made to determine if the modular game is a game of chance. As used herein, a game of chance is a game that requires no particular player skills and whose outcome only depends on random events given predetermined winning odds.

If the modular game is a game of chance, the method flows to operation 364, and if the modular game is not a game of chance the method flows to operation 366. In operation 364, the game of chance is set up with the same winning odds as provided to the challenger when the challenger played the modular game. For example, in a slots game, the slots wheels will be set up with the same winning odds as the slots wheels were set for the challenger. From operation 364, the method flows to operation 368.

In operation 366, the game is set up for a skill game, which is a game whose outcome, at least in part, depends on a level of skill of the player. For example, skill games may include trivia games, problem-solving games, puzzles, shooting games, crossword puzzles, games that depend on reaction times, etc.

In one embodiment, the skills game is a trivia game and the skills game is set up with a different set of trivia questions obtains from a database. In other embodiments, other types of tests may be set up for the skills game. In yet another embodiment, the skill game may also be played as an exact same game (e.g., a car race).

From operation 366, the method flows to operation 368 where the challenged player plays the modular game after the setup of the modular game is completed.

It is noted that the embodiments illustrated in FIG. 3C are exemplary. Other embodiments may utilize different types of modular games, have additional types of modular games, combine multiple setup operations (e.g., shuffle some choices and get new trivia questions), etc. The embodiments illustrated in FIG. 3C should therefore not be interpreted to be exclusive or limiting, but rather exemplary or illustrative.

Figure 4A:
FIGS. 4A-4E illustrate different stages while playing a common bonus game, according to one embodiment

FIGS. 4A-4E illustrate different stages while playing a common bonus game, according to one embodiment. FIG. 4A shows the image of the display presented to the player after the player has won the bonus game. The interface presents the name of the minigame and gives instruction to the player on how to play the game. In the example shown in FIG. 4A, the slots game has a theme related to the movie "The Wizard of Oz," and the name of the minigame is "The man behind the curtain." In addition, a play button is presented so the player can start the minigame.

Figure 4B:
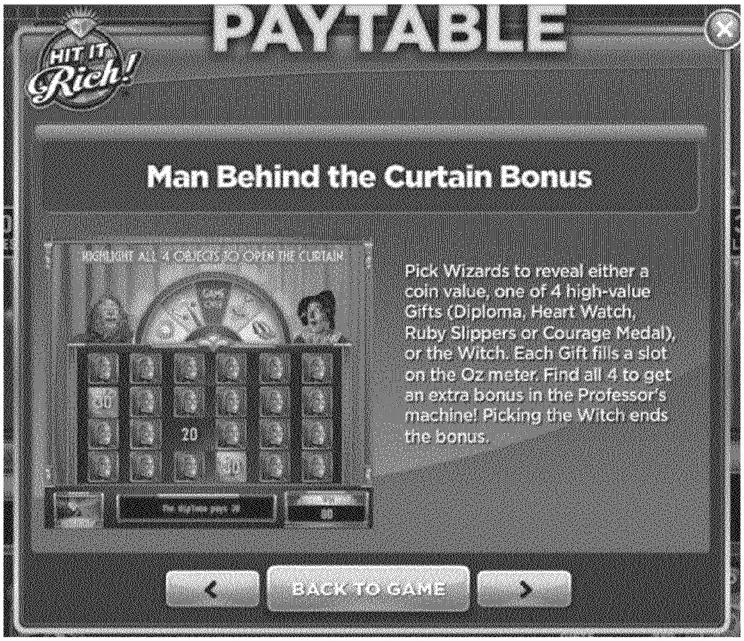

FIG. 4B is an image from the paytable interface within the slots game. In one embodiment, the paytable may be accessed from the minigame or from the slots game. The instructions to play the minigame recite, "Pick wizards to reveal either a coin value, one of 4 high-value Gifts (Diploma, Heart Watch, Ruby Slippers or Courage Metal), or the Which. Each gift fills a slot on the Oz meter. Find all 4 to get an extra bonus in the Professor's machine! Picking the Witch ends the bonus."

Figure 4C:
Figure 4D:

FIG. 4C shows a choice given to the player to select one from three knockers on a door to start the minigame. After the player selects one of the knockers, the minigame starts as shown in FIG. 4D. A matrix of choices is presented to the player, as described above in the instructions.

Figure 4E:

After the minigame ends, the results are presented to the player, as seen in FIG. 4E. The reward, i.e., Bonus Win, is presented to the user (e.g., 2175), and a button is provided for the user to collect her winnings. After the player collects the winnings, the game returns to the main game for playing slots.

Figure 5A:
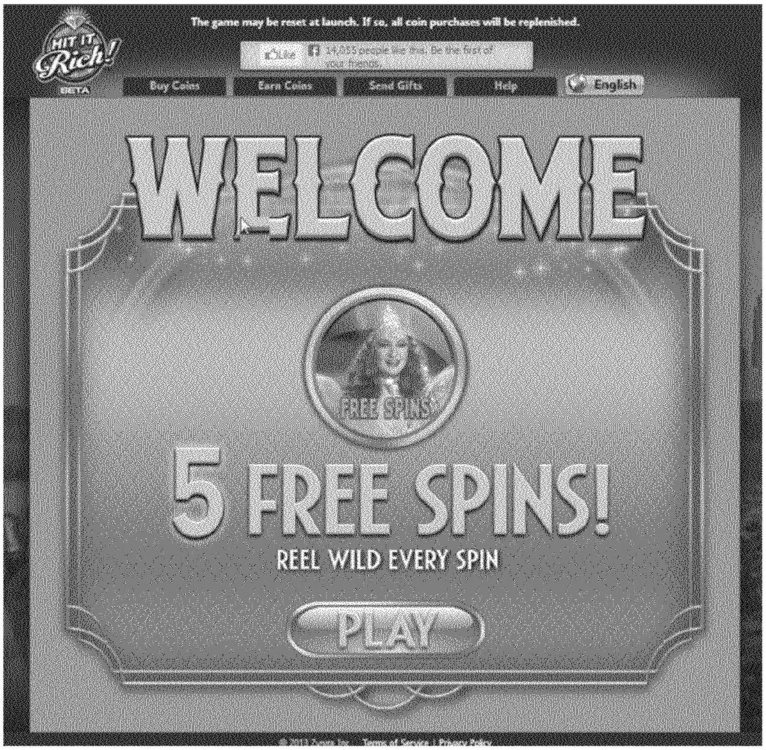
FIGS. 5A-5C illustrate different stages while playing a gifting bonus game, according to one embodiment.
Figure 5B:
Figure 5C:

FIGS. 5A-5C illustrate different stages while playing a gifting bonus game, according to one embodiment. In the gifting bonus, the player gets free spins, or some other free chance game that provides rewards. In FIG. 5A, the game presents the minigame to the player, after the player wins the bonus in the slots game. The player is given 5 free spins, and a play button is provided to start the minigame.

FIG. 5B is an instructions page from the paytable help page. The name of the minigame is "Glinda's Three Spins." The instructions recite, "Take 5 free spins." A vertical Wild is active on reel 5 for the first spin, and moves one reel left with each spin. The game ends when there are no more spins.

FIG. 5C illustrates a capture of the game described with reference to FIG. 5B. After the player uses up all the free spins, a results page is presented with the total winnings. After the player collects the reward, the game returns to the main game for playing slots.

Figure 6A:
FIGS. 6A-6N illustrate different stages while playing a challenge bonus game, according to one embodiment.
Figure 6B:
Figure 6C:
Figure 6D:
Figure 6E:
Figure 6F:
Figure 6G:
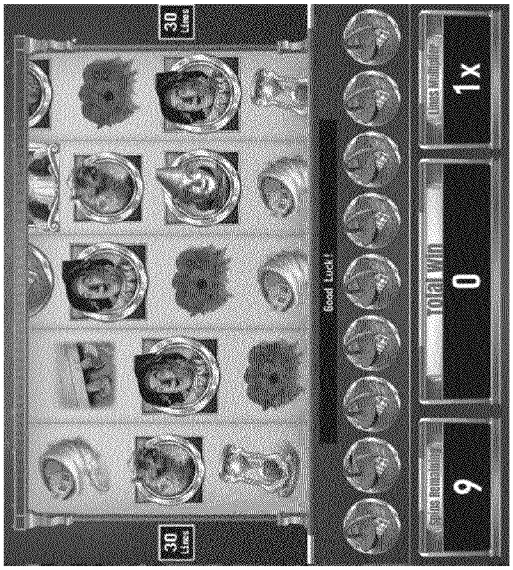
Figure 6H:
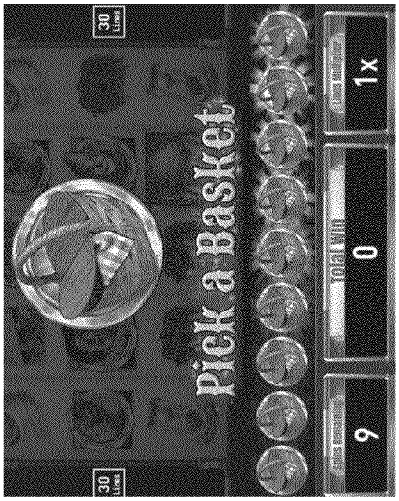
Figure 6I:
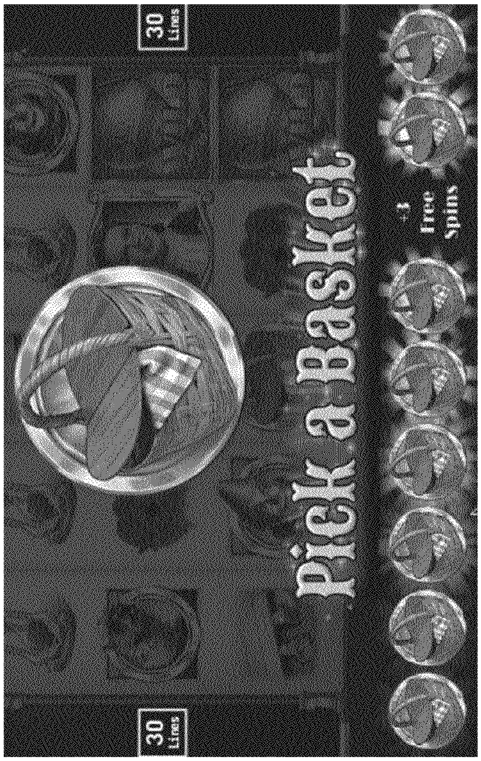
Figure 6J:
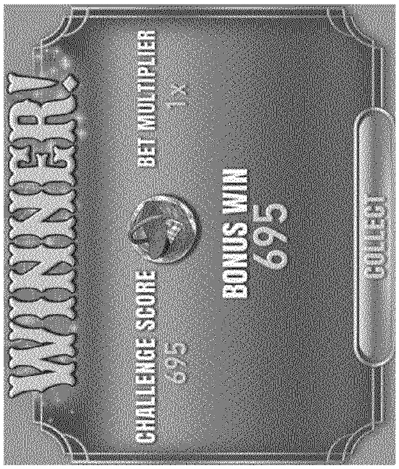
Figure 6K:
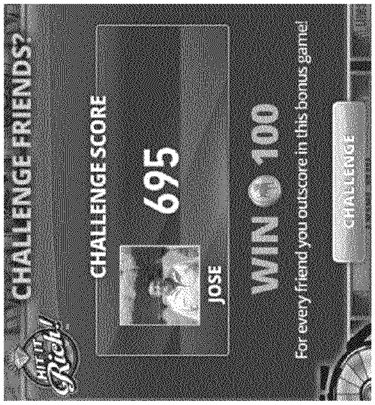
Figure 6L:
Figure 6M:
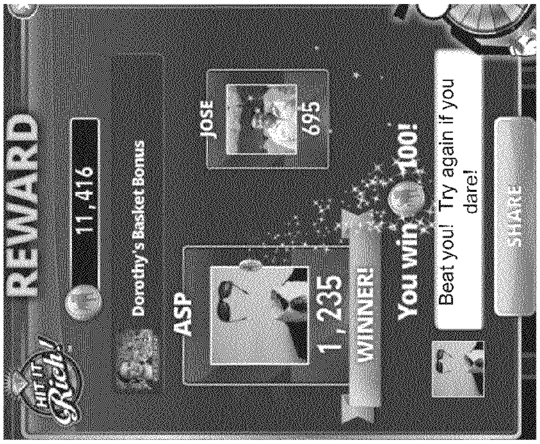
Figure 6N:
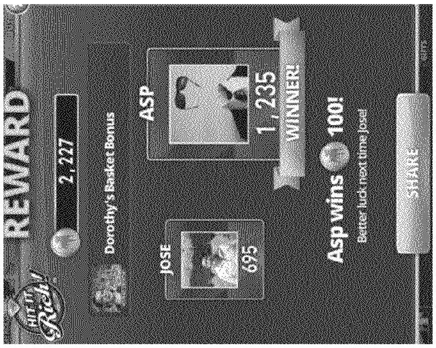

FIGS. 6A-6N illustrate different stages while playing a challenge bonus game, according to one embodiment. FIG. 6A shows the welcome page for the challenge game. The name of this minigame is "The yellow brick road." A message in the page indicates that the player gets 3 extra picks if the player meets the goals.

FIG. 6B shows the instructions page for this game. The instructions recite, "Pick 3 Emeralds to reveal coin values. If their total value reaches the goal amount of the first Progressive award, pick 3 more Emeralds. Keep going until you reach the final Jackpot, or don't reach the next goal. Collect the Progressive award reached!"

After the player selects the play button of FIG. 6A, the player is taken to an interface for selecting emeralds, as shown in FIG. 6C. FIG. 6D illustrates the minigame after the player has selected 3 different emeralds.

After the player completes the minigame, the player is given the reward for playing the minigame (not shown), and then the game asks the player if the player wishes to challenge friends. FIG. 6E illustrates an interface for selecting whether to challenge or not. In the embodiment of FIG. 6E, the player is presented with the score that the player obtained while playing the game. In addition, the game indicates that the player will win hundred coins for every friend the player outscores while playing this challenge. If the player selects the challenge button, then the interface shown in FIG. 6F is presented; otherwise, the player is taken back to the main slots game.

If the player selects to challenge, the player may select one or more friends as shown in FIG. 6F. The player is given the option of selecting friends from all the friends of the player, in the social network and in the game, or selecting friends from the slots game. After the player selects one or more friends, the player may press the button "Select and Send" to send the challenge to the selected friends.

When a friend receives the challenge, if the friend accepts the challenge the friend is taken to the minigame, as shown in FIG. 6A. At the end of the challenge, the interface will let the friend know if the friend has beaten the challenger. If the friend beats the challenger, then the friend wins another 100 chips.

Further, when a challenged player completes the challenge, the challenger receives a notification. If the challenged player did not beat the challenger, the challenger will get the additional reward (e.g., 100 chips).

FIG. 6G illustrates a modular game that combines the chance of winning by spinning the slots wheels and by performing selections from a plurality of hidden rewards. In this game, the option to pick a prize or bonus from the baskets is only given when a certain combination comes up after spinning the wheels (e.g., a basket symbol appears in one or more of the wheels).

If the basket shows up, an interface to pick a basket is provided, as illustrated in FIG. 6H. Behind each basket there is a prize, such as a number of coins, additional spins of the wheels, increase in the multiplier for a winning combination, etc. In one embodiment, the prizes behind each basket are the same for the challenger and the challenged player, but the prizes are shuffled, i.e., the prizes are not in exactly the same positions (unless of course, the result of the shuffle is exactly the same combination, which may occur with a very low probability).

After the player clicks one of the baskets, the prize is revealed (e.g., three additional free spins), as illustrated in FIG. 6I. The player is then taken back to the interface for playing the slots, with the three additional spins. The player will play the slots until the player runs out of spins. Of course, if the basket symbol shows up again in any of the wheels, the interface to pick up a basket will be presented again, but the basket already selected will not be available as a choice.

After the player runs out of spins, the game ends and the player is awarded the bonus win based on the results of spinning the wheels. FIG. 6J is a screen illustrating a bonus collection interface after the completion of the modular game. In this case, the player has won 695 coins, which will be added to the account of the player. In other embodiments, other types of rewards may be awarded, such as an increase in the game score, a new tool, a new weapon, gain access to a new game feature (e.g., a new world), etc.

After the player collects the rewards of the modular game, the player is given the option to challenge another player, unless the player played the modular game as a challenge. FIG. 6K illustrates an interface for challenging another player. The player is given the score obtained in the modular game, to assist in deciding if the player wants to challenge another player. A challenge button is provided, and if the player selects the challenge button, the player is taken to another interface (such as the one in FIG. 6F) to select the one or more players to challenge.

In another embodiment (not shown), the player is given the option to challenge other players that are not friends of the player, that is, challenging anyone that plays the online game.

In yet another embodiment (not shown), the player is given the option to enter a wager amount for the challenge to bet against the challenged player in the modular game. In one embodiment, a wager fee is discounted from the winner of the challenge, where the wager fee is a percentage of the wager amount.

When the player wins a chance to challenge other players (i.e., the player wins a “challenge”) the player may challenge right away or postpone the challenge until a later time. In one embodiment, an interface to track challenges is provided, as illustrated in FIG. 6L. In one embodiment, the interface lets the player know how many challenges are available, how to check for pending challenges, and the results of completed challenges.

In one embodiment (not shown), a leaderboard for challenges is provided by the game. The leaderboard keeps track of the accumulated score of a player when playing challenges, and the leaderboard includes the player and friends of the player in a social network or in the game. In one embodiment, the leaderboard is used to get additional awards to the leaders, such as getting a super bonus to the weekly winner, or a super challenge, etc. The leaderboard may be reset periodically, such as daily, weekly, monthly, yearly, etc. etc.

FIG. 6M shows an interface presented after a player completes a challenge. The result of the challenge is presented, whether the challenged player won or lost. If the challenged player won, then the challenged player gets the challenge bonus. In this exemplary interface, a text input box is also provided to send a message to the other player or to share the good news on the social network.

FIG. 6N shows the interface presented to the challenger, after the challenger is notified that the challenge has been completed by the challenged player. In this case, the challenger did not win so the challenger is informed that the friend won the challenge bonus. The scores for both players are also presented.

In another embodiment (not shown), an additional option is provided to send a new challenge to the second player if the second player won the challenge. In other words, the user is able to re-challenge the other player (e.g., double or nothing). Sometimes, the user may incur a cost (e.g., game currency) to be able to re-challenge, or one of the challenges available to the player is spent to re-challenge.

In yet another embodiment, the game keeps track of the head-to-head challenges between two players and gives a tally of the results. For example, at the end of one challenge the game may display “Your overall score of challenges with John is 5-3.” The tally may keep track of all the challenges between the two players, and the score in head-to-head may be the result of a lifetime of challenges, or the result for a period of time (e.g., in the current month). Thus, the head-two-head score may be reset periodically.

Figure 7A:
FIGS. 7A-7B shows the paytable, according to one embodiment.
Figure 7B:
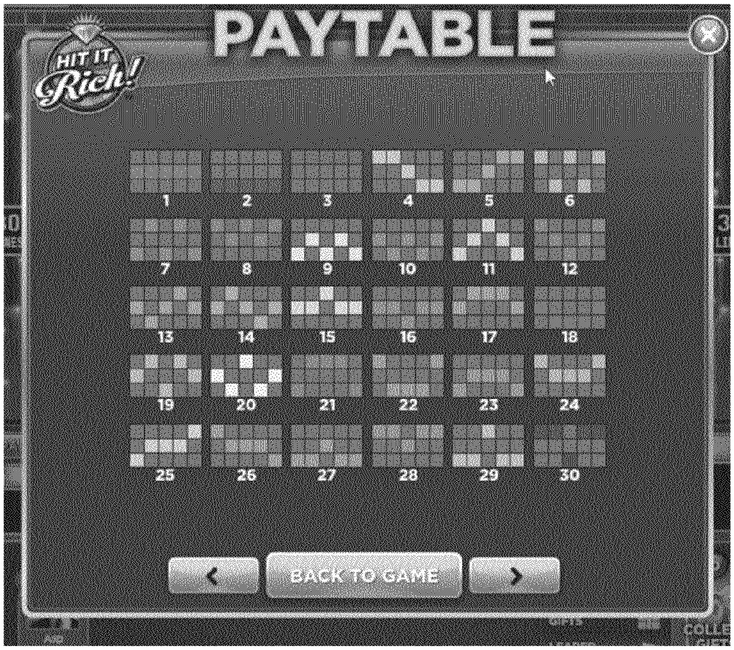

FIGS. 7A-7B show the paytable, according to one embodiment. The paytable option may be selected by the player while playing the slots game. This is a help menu that describes instructions for playing the game, including the combinations for winning, and the instructions for the mini-games, as previously described.

FIG. 7A describes some special icons used in the slots game, such as the wildcard and the bonus game. On the right part of FIG. 7A, a description is provided regarding the winning combinations in the slots game. The instructions recite, “Win combinations must appear on a single payline starting with the left most reel.” For each of the icons in a winning combination, a number is provided regarding the winnings for matching 3, 4, or 5 symbols.

FIG. 7B illustrates the different paylines for each bet. In one embodiment, each time the player spins, the player bets on 30 paylines, as shown in FIG. 7B. Each payline includes one symbol from each reel, where the symbol can be from the top, metal, or bottom row. Each payline is different, and at the end of each spin, the game presents the winning paylines to the player, if any.

Figure 8A:
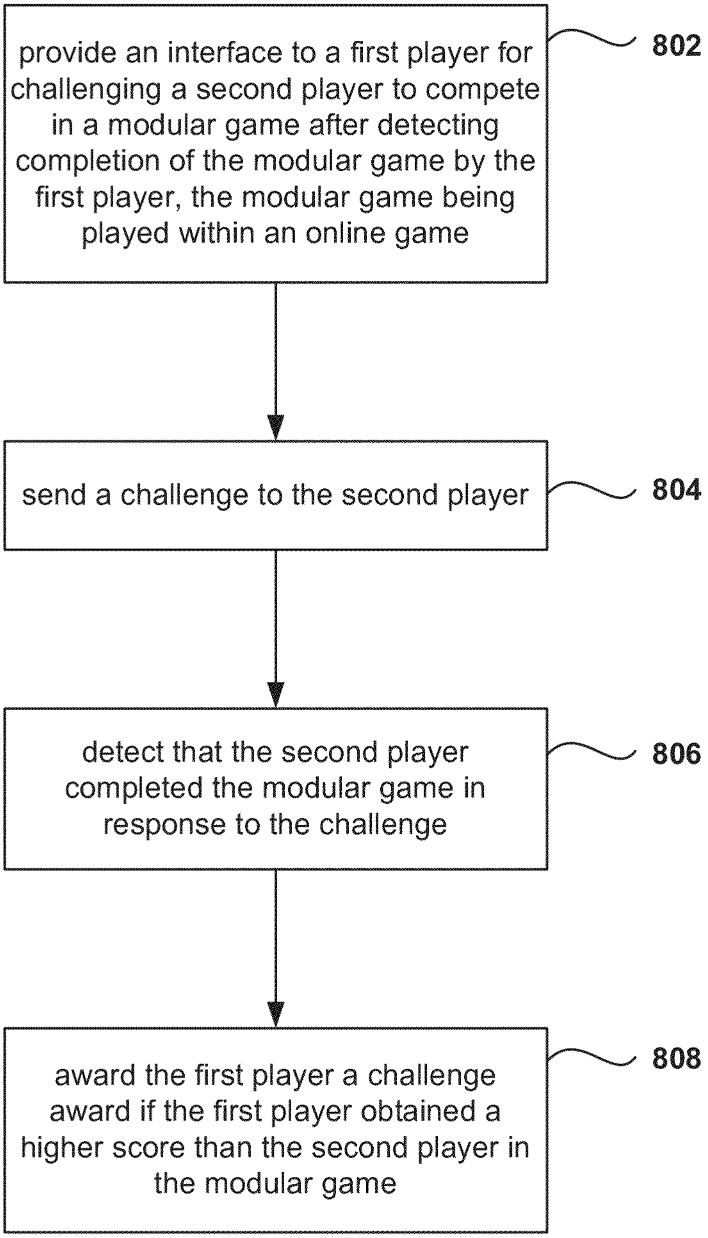
FIG. 8A is a flowchart of a method for challenging players in an online game, according to one embodiment.

FIG. 8A is a flowchart of a method for challenging players in an online game, according to one embodiment. While the various operations in this flowchart are presented and described sequentially, one of ordinary skill will appreciate that some or all of the operations may be executed in a different order, be combined or omitted, or be executed in parallel.

In operation 802, an interface is provided to a first player for challenging a second player to compete in a modular game after detecting completion of the modular game by the first player, the modular game being played within an online game (see for example FIG. 6K).

From operation 802, the method flows to operation 804 where the challenge is sent to the second player if the first player decided to challenge. From operation 804, the method flows to operation 806 for detecting that the second player completed the modular game in response to the challenge. The game then determines who the winner of the challenge is and, in operation 808, if the first player obtained a higher score than the second player in the modular game then the first player is awarded a challenge award.

Figure 8B:
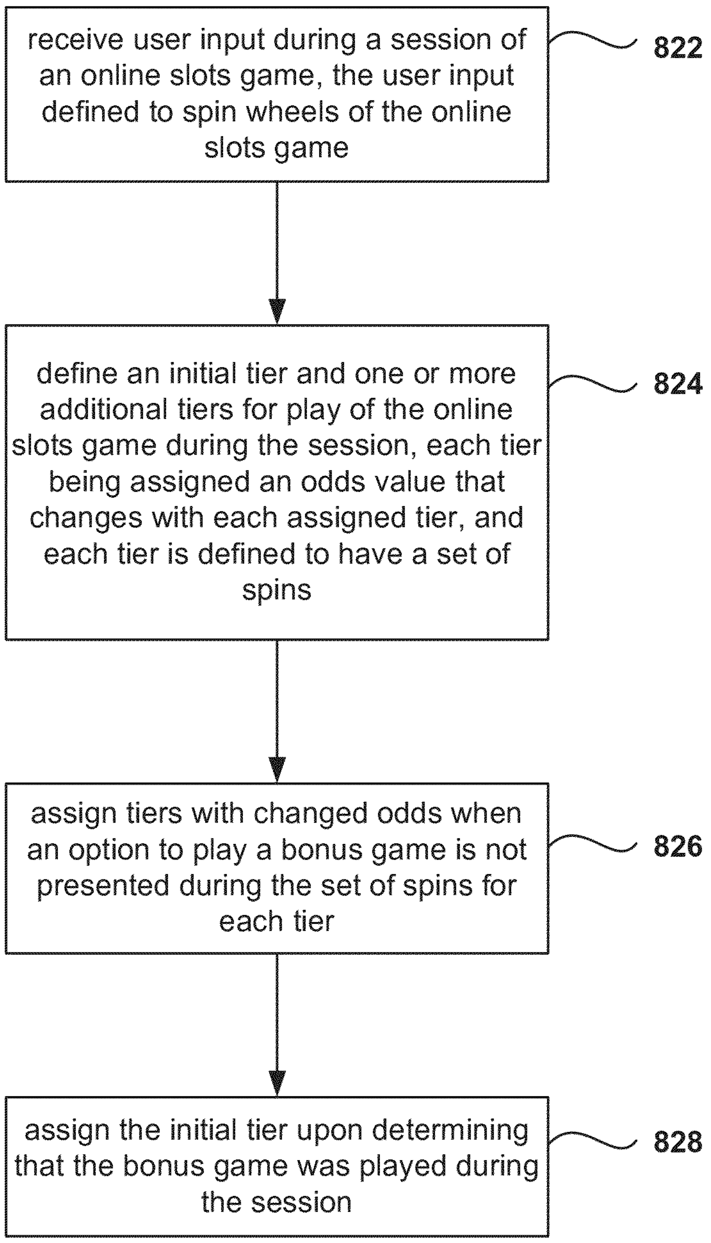
FIG. 8B is a flowchart of a method for adjusting the bonus winning odds, according to one embodiment.

FIG. 8B is a flowchart of a method for adjusting the bonus winning odds, according to one embodiment. While the various operations in this flowchart are presented and described sequentially, one of ordinary skill will appreciate that some or all of the operations may be executed in a different order, be combined or omitted, or be executed in parallel.

In operation 822, user input is received during a session of the online slots game, the user input defined to spin wheels of the online slots game. From operation 822, the method flows to operation 824 for defining an initial tier and one or more additional tiers for play of the online slots game during the session. Each tier is assigned an odds value that changes with each assigned tier, and each tier is defined to have a set of spins.

Further, from operation 824, the method flows to operation 826 where tiers with changed odds are assigned when an option to play a bonus game is not presented during the set of spins for each tier. Further yet, from operation 826 the method flows to operation 828 for re-assigning the initial tier upon determining that the bonus game was played during the session.

Figure 9A:
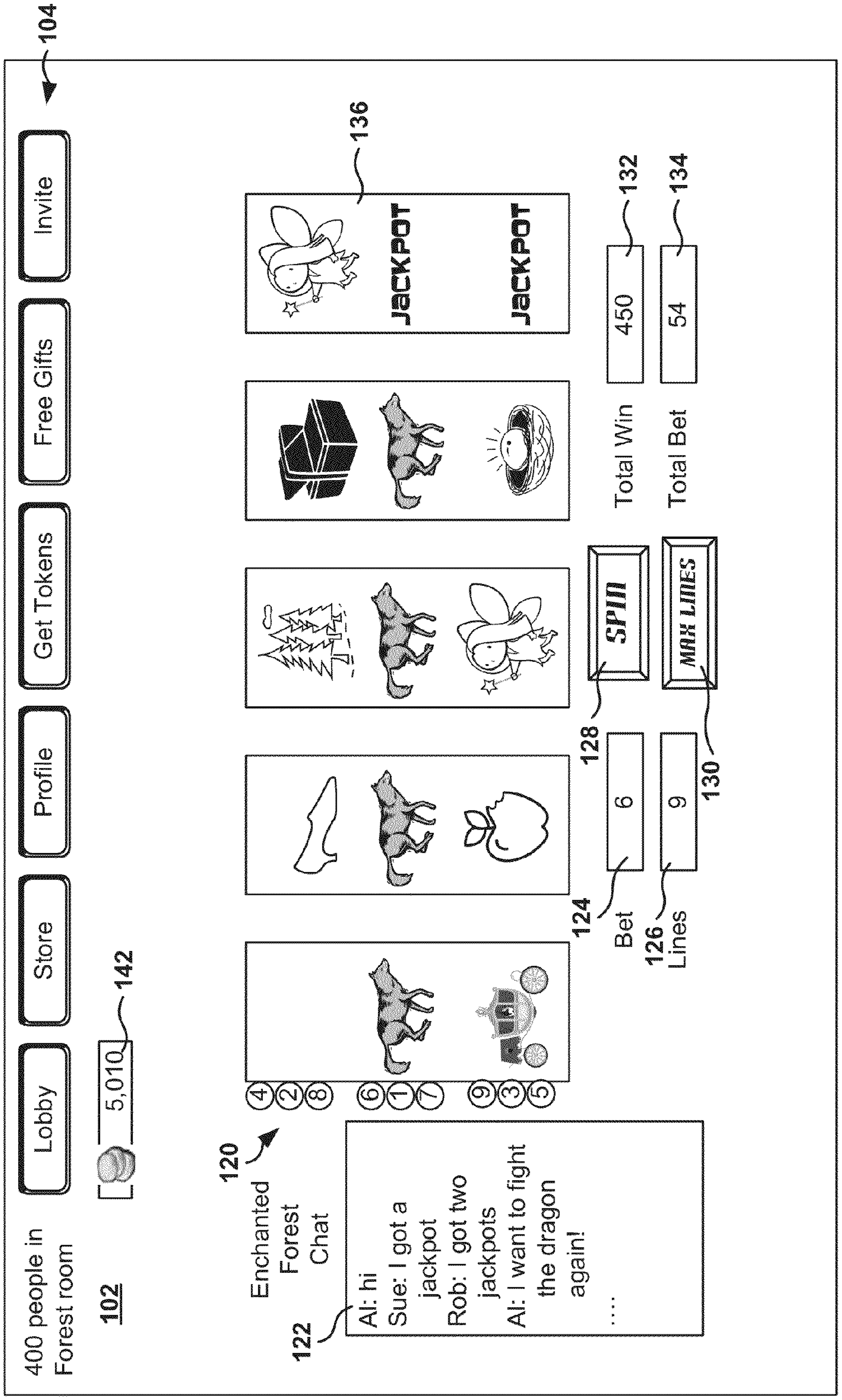
FIG. 9A is a Graphical User Interface (GUI) for playing a slots game, according to one embodiment.

FIG. 9A is a Graphical User Interface (GUI) for playing a slots game, according to one embodiment. As used herein, a “friend” of a player refers to a person that has established a social link with the player in the game. For example, a first player has invited a second player to be “buddies” or “friends” in the game, and the second player has accepted, which makes them “friends” in the game. In other embodiments, the friendship in the game is established via a social network, such that friends of the player in the social network become friends of the player in the online game. It is noted that although two persons may be friends in real life, if the two persons have not established a friendship relationship online, they will not be considered friends in the online game. Of course, if two persons do not know each other in real life, and they do not have an online friendship relationship, the two persons will not be friends in the game.

It is also noted that the embodiments described herein are described with reference to the slots online game, but the principles may be utilized in other gambling online games, as well as in gambling real-life games. The embodiments described herein should therefore not be interpreted to be exclusive or limiting, but rather exemplary or illustrative.

The game interface display 102 includes a slots-playing area, and overhead selection buttons 104. The GUI includes a lobby, where the player may select one of several rooms for playing slots games. The rooms have different themes, such as underwater world, desert, city, tropical paradise, battle zone, animal reserve, etc. There could be several instances of a theme, so there may be several rooms with the same theme. Once the player selects a room, the player is presented GUI 102 to play slots, such as the one shown in FIG. 9A.

There are players going in and out of the slots rooms. There is a lobby, and the player may select from different rooms. For example, there is an underwater room, a desert room, a jungle room, etc. There could be several instances of a room with, for example, 100 people or more.

The slots-playing area includes slot wheels 136, a chat area 122, and buttons and counters related to the betting in the slots game. The wheels 136 spin when the player presses (e.g., clicks on) the spin button 128. The player is able to enter the amount of lines 126 to bet on each wheel spin. Each line includes a different combination of locations within each wheel. For example, one line may include the five locations across the center line, while other lines may form different combinations of locations, such as the top location on the first three wheels, followed by the center location on the fourth wheel, and followed by the bottom location on the fifth wheel.

In bet field 124 the player enters the amount being bet for each line, and the total bet field 134 indicates the total amount bet in the current spin. Counter 142 indicates the amount of currency owned by the player for placing bets in the slots game. The total bet amount is equal to the number of lines 126 times the bet per line 124. A maximum lines button 130 provides a shortcut to the player for betting the maximum number of lines. When the player gets a winning combination of the wheels, the total win field 132 indicates the amount won. The chat area 122 allows players in the same room to exchange messages with each other or with the whole community in the room.

It is noted that the embodiments illustrated in FIG. 9A are exemplary. Other embodiments may utilize different layouts, adventure games, game themes, betting mechanisms, etc. The embodiments illustrated in FIG. 9A should therefore not be interpreted to be exclusive or limiting, but rather exemplary or illustrative.

Figure 9B:
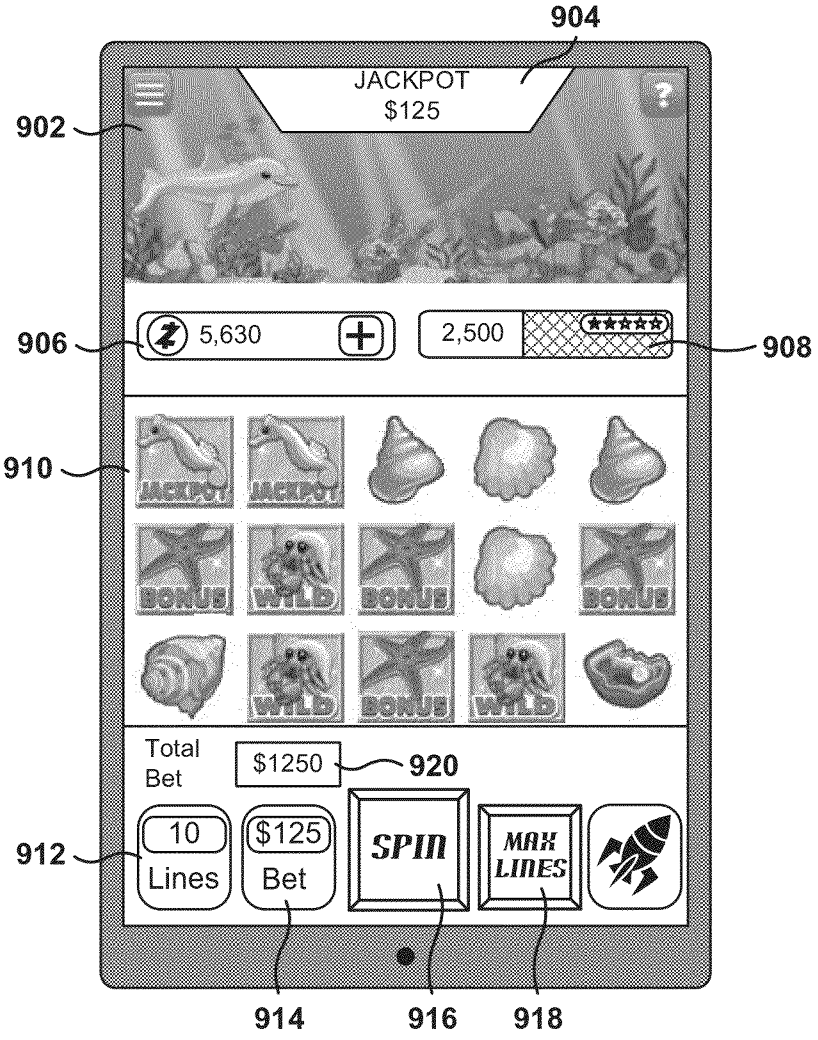
FIG. 9B illustrates an interface for playing a game in a mobile device, according to one embodiment.

FIG. 9B illustrates an interface for playing a game in a mobile device, according to one embodiment. Once the player selects a theme machine, the player is presented a GUI 902 to play slots, such as the one shown in FIG. 9B. On the top, the jackpot amount 904 is displayed. The total amount of currency to bet in the game is presented in field 906, and a progress bar 908 shows the progress made by the player in the current machine. The progress bar 908 also includes a number of stars earned in the theme machine.

The wheels 910 spin when the player presses the spin button 916. The player is able to enter the amount of lines 912 being bet on every time the wheels spin. Each of the lines includes a different combination of symbols from the wheels. For example, one line may include the five symbols across the center line, while other lines may form different combinations of symbols, such as the top symbol on the first three wheels, followed by the center symbol in the fourth wheel, and followed by the bottom symbol in the fifth wheel.

In one embodiment, the player must get a specific combination of the wheels to win the jackpot or to win the bonus game. For example, the player must get five "jackpot" symbols across the center line. This means that the jackpot is a random event-based on the probability of obtaining the "jackpot" symbol in each of the wheels. Therefore, in one embodiment, the jackpot is based on luck and not based on other factors, such as when the jackpot reaches a certain value.

In another embodiment, the jackpot size may be also based on other factors besides the probability of the wheels, and the probability to win the jackpot may change when the jackpot reaches a certain size, or a certain age (e.g., elapsed since the jackpot was initialized), etc.

In bet field 914 the player enters the amount being bet for each line, and the total bet field 920 indicates the total amount bet in the current spin. The total bet amount is equal to the number of lines 912 times the bet per line $125. A maximum lines button 918 provides a shortcut to the player for betting the maximum number of lines.

Figure 10:
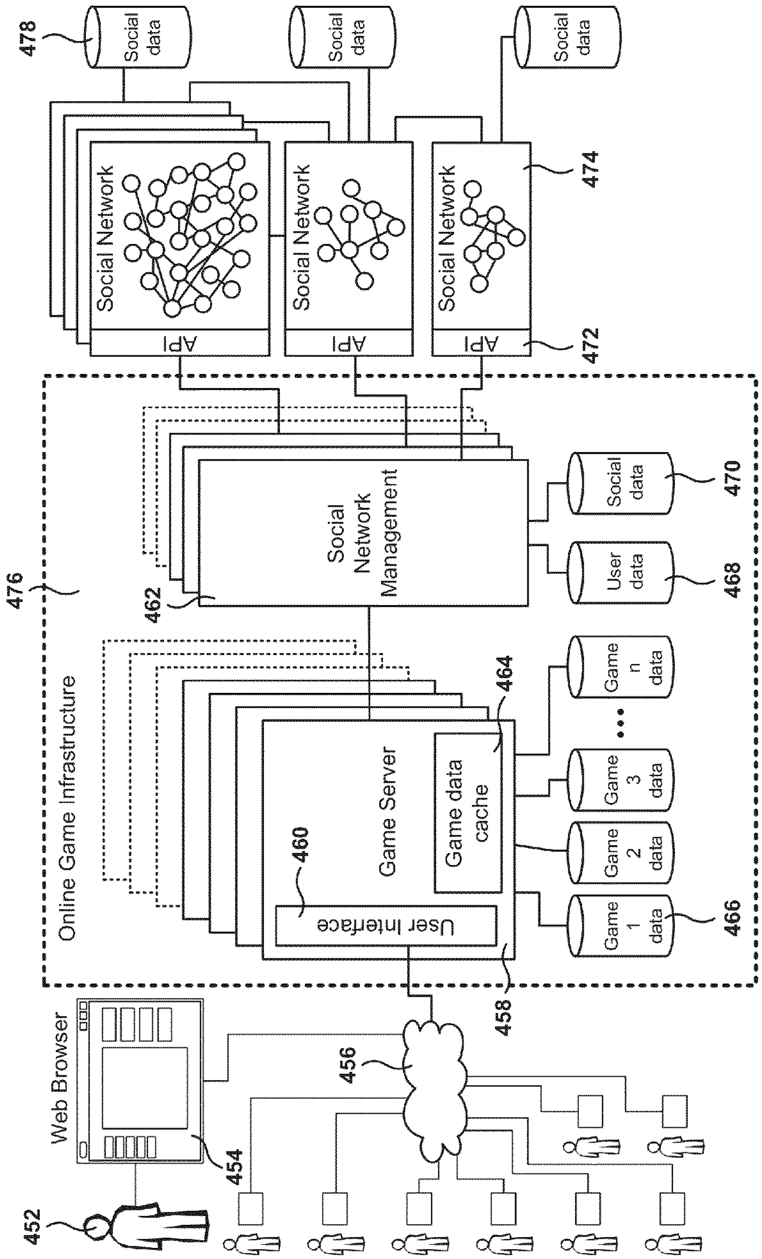
FIG. 10 illustrates an implementation of a Massively Multiplayer Online (MMO) infrastructure, according to one embodiment.

FIG. 10 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data. In addition, a single database can store game data for one or more online games. Each game server 458 may also include one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 10 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 10 should therefore not be interpreted to be exclusive or limiting, but rather exemplary or illustrative.

Figure 11:
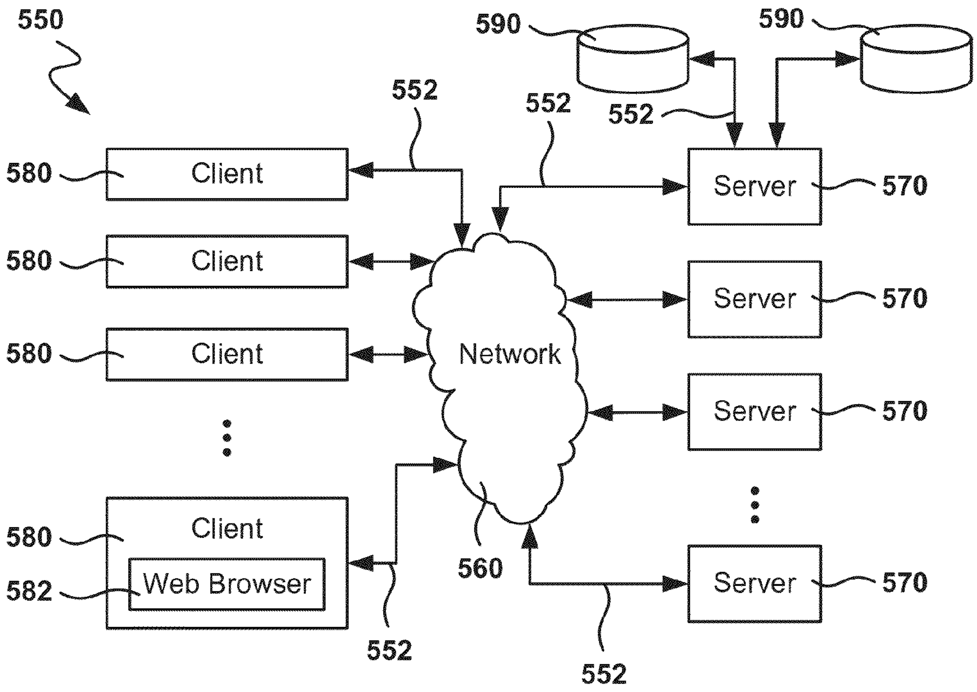
FIG. 11 illustrates an example network environment suitable for implementing embodiments.

FIG. 11 illustrates an example network environment 550 suitable for implementing embodiments. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wired, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, community server, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HyperText Markup Language (HTML) files or other file types, or may dynamically create or constitute files upon a request, and communicate them to clients 580 in response to Hypertext Transfer Protocol (HTTP) or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as Microsoft Internet Explorer, Google Chrome, Or Mozilla Firefox, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 12:
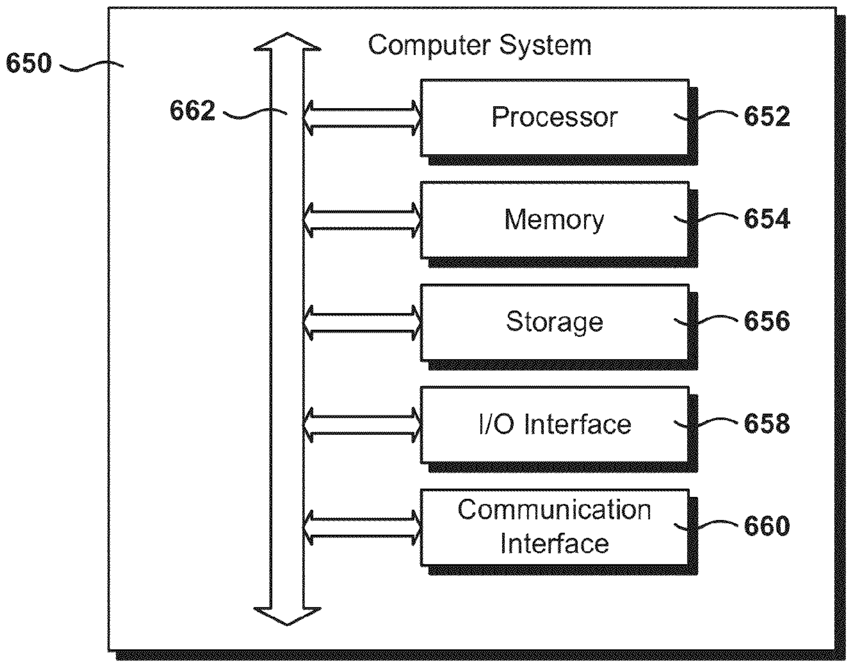
FIG. 12 illustrates an example computer system for implementing embodiments.

FIG. 12 illustrates an example computer system 650 for implementing embodiments. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include a Hard Disk Drive (HDD), a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

One or more embodiments can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method comprising:

receiving, by a game server, from a client computer input entered by a user during a session of an online slots game, the input defined to spin wheels of the online slots game, the game server being part of a plurality of games servers configured to interface with a plurality of clients over a network for playing the online slots game;

defining an initial tier and one or more additional tiers for play of the online slots game, each tier being assigned an odds value that changes with each assigned tier, and each tier is defined to have a set of spins;

assigning, by the game server, the initial tier when the user begins playing the online slots game;

assigning, by the game server, tiers with changed odds when an option to play a bonus game is not presented during the set of spins for each tier; and assigning, by the game server, the initial tier upon determining that the bonus game was played during the session, wherein the operations of the method are executed by a processor.

2. The method as recited in claim 1, wherein assigning the initial tier further includes:

initializing a spin counter, wherein the set of spins for each tier is defined for a range of values of the spin counter.

3. The method as recited in claim 2, wherein assigning tiers further includes:

determining that the spin counter has reached a maximum value for the range of values; and assigning a new tier based on the determination that the spin counter has reached the maximum value.

4. The method as recited in claim 1, wherein the odds value defines a probability of winning a chance to play the bonus game.

5. The method as recited in claim 1, wherein each tier further assigns an average reward, wherein an expected payback for winning the bonus game is constant across all tiers.

6. The method as recited in claim 5, wherein the expected payback is equal to the odds value times the average reward.

7. The method as recited in claim 1, wherein assigning tiers further includes:

increasing the odds value and decreasing an average reward to keep constant across all tiers an expected payback for winning when playing the bonus game.

8. The method as recited in claim 1, further including:

using a random number generator to determine an outcome of spinning the wheels.

9. The method as recited in claim 8, wherein the odds value is changed by increasing a number of bonus symbols in one or more wheels.

10. The method as recited in claim 1, wherein a type of the bonus game is selected from a group consisting of a common bonus game, or a gifting bonus game, or a challenge bonus game, wherein the common bonus game is not a slots game, wherein the gifting bonus game is a slots-type game with different slots symbols than the slots game, wherein the challenge bonus game is game that provides a score and an opportunity to a player to challenge another player to play the challenge bonus game.

11. The method as recited in claim 1, wherein the odds value is increased when a new tier is assigned.

12. The method as recited in claim 1, wherein the set of spins includes a predefined number of spins.

13. The method as recited in claim 1, wherein the set of spins includes a random number of spins.

14. A method comprising:

initializing at a game server a spin counter in an online slots game, the game server being part of a plurality of games servers configured to interface with a plurality of clients over a network for playing the online slots game;

setting, by the game server, a first tier from a plurality of tiers as a current tier to play the online slots game, wherein each tier from the plurality of tiers defines a bonus winning odds, an average reward, and a spin count, wherein the bonus winning odds identifies a probability of winning a chance to play a bonus game;

setting, by the game server, a second tier as the current tier when the spin counter reaches the spin count of the first tier, wherein the second tier defines higher bonus winning odds than the first tier and the second tier has a lower average reward than the first tier to keep an expected payback for winning the bonus game constant across all tiers;

setting, by the game server, a third tier as the current tier when the spin counter reaches the spin count of the second tier;

providing, by the game server, an interface to play the bonus game when a player wins the chance to play the bonus game; and reinitializing, after the player plays the bonus game, the spin counter and setting the first tier as the current tier, wherein the operations of the method are executed by a processor.

15. The method as recited in claim 14, wherein the player wins the chance to play the bonus game when a predefined bonus-winning combination appears on slots wheels.

16. The method as recited in claim 14, wherein operations of the method are performed by a computer program when executed by one or more processors, the computer program being embedded in a non-transitory computer-readable storage medium.

17. A non-transitory computer-readable storage medium storing a computer program, the computer-readable storage medium comprising:

program instructions for receiving, by a game server, from a client computer input entered by a user during a session of an online slots game, the input defined to spin wheels of the online slots game, the game server being part of a plurality of games servers configured to interface with a plurality of clients over a network for playing the online slots game;

program instructions for defining an initial tier and one or more additional tiers for play of the online slots game, each tier being assigned an odds value that changes with each assigned tier, and each tier is defined to have a set of spins;

program instructions for assigning, by the game server, the initial tier when the user begins playing the online slots game;

program instructions for assigning, by the game server, tiers with changed odds when an option to play a bonus game is not presented during the set of spins for each tier; and program instructions for assigning, by the game server, the initial tier upon determining that the bonus game was played during the session.

18. The storage medium as recited in claim 17, wherein assigning the initial tier further includes:

initializing a spin counter, wherein the set of spins for each tier is defined for a range of values of the spin counter.

19. The storage medium as recited in claim 18, wherein assigning tiers further includes:

determining that the spin counter has reached a maximum value for the range of values; and assigning a new tier based on the determination that the spin counter has reached the maximum value.

20. The storage medium as recited in claim 17, wherein the odds value defines a probability of winning a chance to play the bonus game.

21. The storage medium as recited in claim 17, wherein each tier further assigns and average reward, wherein an expected payback for winning the bonus game is constant across all tiers.

22. The storage medium as recited in claim 17, wherein a type of the bonus game is selected from a group consisting of a common bonus game, or a gifting bonus game, or a challenge bonus game, wherein the common bonus game is not a slots game, wherein the gifting bonus game is a slots-type game with different slots symbols than the slots game, wherein the challenge bonus game is game that provides a score and an opportunity to a player to challenge another player to play the challenge bonus game.

* * * * *